(12) United States Patent
Walsh et al.

(10) Patent No.: US 12,333,330 B1
(45) Date of Patent: Jun. 17, 2025

(54) APPARATUS AND METHOD FOR INCREASING SECURITY OF A VIRTUAL MACHINE

(71) Applicant: Parry Labs, LLC, Alexandria, VA (US)

(72) Inventors: David Walsh, Alexandria, VA (US); Charles Adams, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/889,946

(22) Filed: Sep. 19, 2024

(51) Int. Cl.
*G06F 9/455* (2018.01)
*B64C 13/00* (2006.01)
*B64C 39/00* (2023.01)

(52) U.S. Cl.
CPC .......... *G06F 9/45558* (2013.01); *B64C 13/00* (2013.01); *B64C 39/00* (2013.01); *G06F 2009/45587* (2013.01)

(58) Field of Classification Search
CPC .................. G06F 9/45558; G06F 2009/45587
See application file for complete search history.

(56) References Cited

U.S. PATENT DOCUMENTS

| | | | |
|---|---|---|---|
| 2018/0060584 A1* | 3/2018 | Ahuwanya | G06F 21/6218 |
| 2021/0109775 A1* | 4/2021 | Shen | G06F 9/545 |
| 2021/0117244 A1* | 4/2021 | Herdrich | G06F 9/5077 |
| 2022/0174587 A1* | 6/2022 | Soryal | H04W 48/18 |
| 2023/0094125 A1* | 3/2023 | Rogers | G06F 21/53 713/190 |
| 2023/0103518 A1* | 4/2023 | Rogers | G06F 9/45558 726/26 |
| 2024/0253217 A1* | 8/2024 | Vahdat | B25J 9/1697 |
| 2024/0273411 A1* | 8/2024 | Mueck | H04L 9/3263 |

FOREIGN PATENT DOCUMENTS

| | | | |
|---|---|---|---|
| CN | 115617458 A | | 1/2023 |
| CN | 115934245 A | | 4/2023 |

\* cited by examiner

*Primary Examiner* — Kenneth Tang
(74) *Attorney, Agent, or Firm* — Caldwell Intellectual Property Law

(57) ABSTRACT

An apparatus and method for increasing security of a virtual machine are disclosed. The apparatus includes a host circuit having at least a processor and a memory, wherein the at least a processor is configured to receive at least a software module, create a virtual environment, which includes creating a plurality of partitions including a virtual machine (VM), determine a compliance category of the at least a software module as a function of an adherence of the at least a software module to at least one operational rule, isolate the at least a software module to the VM of a software module partition of the plurality of partitions, which includes adjusting partition connections between the software module partition and other partitions of the plurality of partitions within the virtual environment as a function of the compliance category and execute the at least a software module within the virtual environment.

20 Claims, 8 Drawing Sheets

APPARATUS AND METHOD FOR INCREASING SECURITY OF A VIRTUAL MACHINE

FIELD OF THE INVENTION

The present invention generally relates to the field of virtual environment computing. In particular, the present invention is directed to an apparatus and method for increasing security of a virtual machine.

BACKGROUND

In recent years, virtualization technology has become increasingly prevalent in various computing environments, offering a wide range of benefits such as resource optimization, flexibility, and scalability. Virtual environments, facilitated by virtual machines (VMs), allow multiple operating systems to run concurrently on a single physical machine, effectively abstracting hardware resources from the underlying physical infrastructure. Despite the widespread adoption of virtualization technology, certain challenges persist, particularly in the areas of security. Traditional virtualization techniques does not suffice the need for improved security of virtual machines within the virtual environments.

SUMMARY OF THE DISCLOSURE

In an aspect, an apparatus for increasing security of a virtual machine is disclosed. The apparatus includes a host circuit having at least a processor and a memory communicatively connected to the at least a processor, wherein the memory contains instructions configuring the at least a processor to receive at least a software module, create a virtual environment, wherein creating the virtual environment includes creating a plurality of partitions, wherein each of the plurality of partitions includes a virtual machine (VM), determine a compliance category of the at least a software module as a function of an adherence of the at least a software module to at least one operational rule, isolate the at least a software module to the VM of a software module partition of the plurality of partitions, wherein isolating the at least a software module includes adjusting partition connections between the software module partition and other partitions of the plurality of partitions within the virtual environment as a function of the compliance category and execute the at least a software module within the virtual environment.

In another aspect, a method for increasing security of a virtual machine is disclosed. The method includes receiving, using at least a processor of a host circuit, at least a software module, creating, using the at least a processor, a virtual environment, wherein creating the virtual environment includes creating a plurality of partitions, wherein each of the plurality of partitions includes a virtual machine (VM), determining, using the at least a processor, a compliance category of the at least a software module as a function of an adherence of the at least a software module to at least one operational rule, isolating, using the at least a processor, the at least a software module to the VM of a software module partition of the plurality of partitions, wherein isolating the at least a software module includes adjusting partition connections between the software module partition and other partitions of the plurality of partitions within the virtual environment as a function of the compliance category and executing, using the at least a processor, the at least a software module within the virtual environment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for increasing security of a virtual machine are disclosed. The apparatus includes a host circuit having at least a processor and a memory communicatively connected to the at least a processor, wherein the memory contains instructions configuring the at least a processor to receive at least a software module, create a virtual environment, wherein creating the virtual environment includes creating a plurality of partitions, wherein each of the plurality of partitions includes a virtual machine (VM), determine a compliance category of the at least a software module as a function of an adherence of the at least a software module to at least one operational rule, isolate the at least a software module to the VM of a software module partition of the plurality of partitions, wherein isolating the at least a software module includes adjusting partition connections between the software module partition and other partitions of the plurality of partitions within the virtual environment as a function of the compliance category and execute the at least a software module within the virtual environment. Exemplary embodiments illustrating aspects of the present disclosure are described below in the context of several specific examples.

Figure 1:
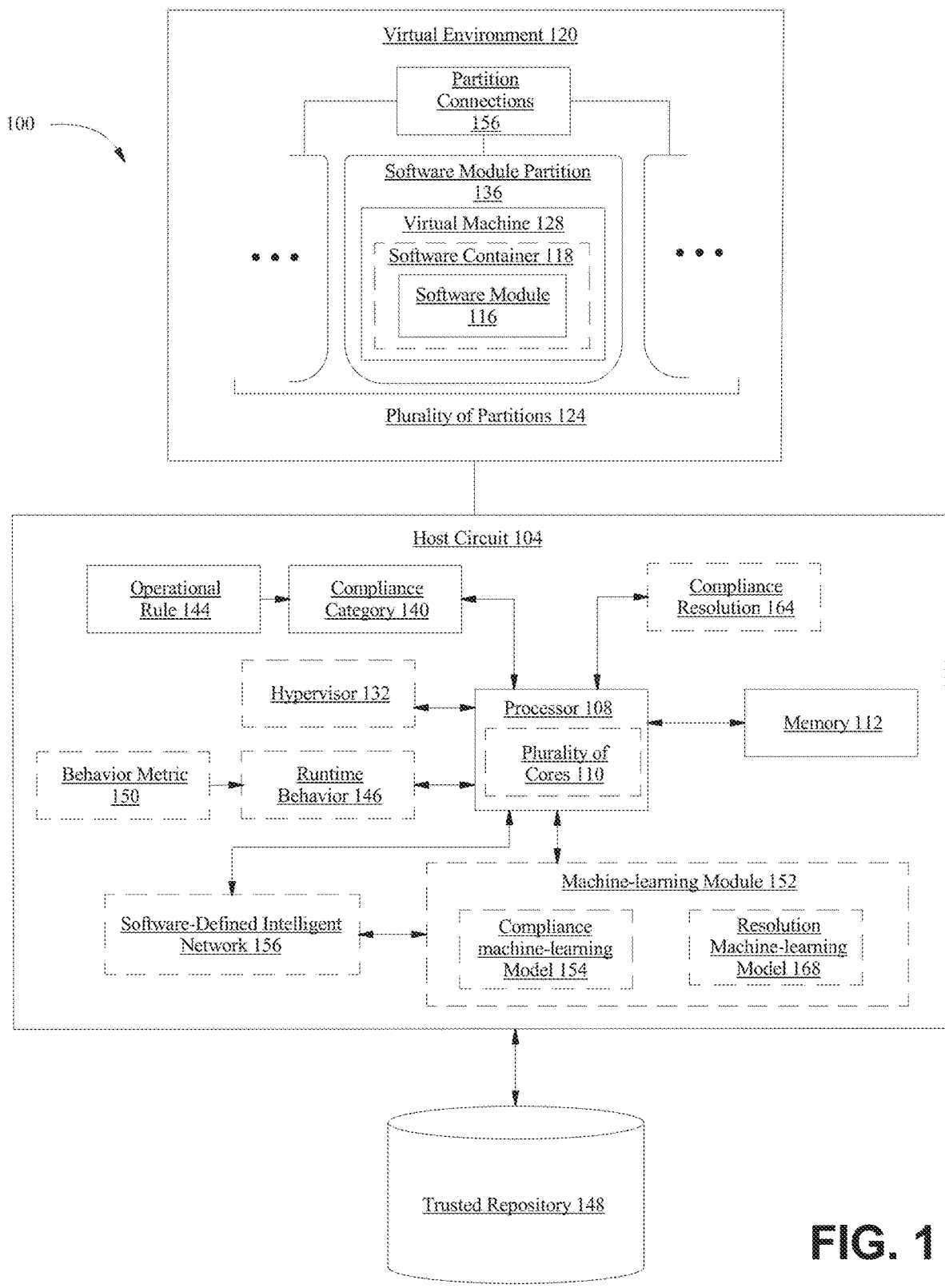
FIG. 1 illustrates a block diagram of an exemplary apparatus for increasing security of a virtual machine.

Referring now to FIG. 1, an exemplary embodiment of an apparatus 100 for increasing security of a virtual machine is illustrated. In one or more embodiments, apparatus 100 is configured to implement one or more aspects of a safety-critical operating environment. As used in this disclosure, a "safety-critical operating environment" is a system, application, or context in which the proper and error-free operation is vital to ensure the safety of both user and property. Failures, malfunctions, or unintended behaviors in such environment may lead to severe harm or consequences, especially in aviation systems, such as flight control system, air traffic control system, an any other avionic components within an aircraft or broader aviation infrastructure shoes correct operation is imperative to ensure the safety of the flight, passengers, crew, and others on the ground. In a non-limiting example, air vehicle system operates may contain a myriad of subsystems categorized as "avionics" (i.e., electronics in the air composed of hardware, software, and/or firmware, or a combination thereof) that are a mix of Government Furnish Equipment (GFE) and Contractor Furnished Equipment (CFE), wherein each avionics subsystem within the mission system may include one or more application software (each containing millions of lines of software source code) that perform functions some of which have been determined to be safety critical by the required and/or independent Army authority.

With continued reference to FIG. 1, in or more embodiments, apparatus 100 may implement one or more aspects of Future Airborne Computing Environment (FACE™). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein host circuit 104 may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependent for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, apparatus 100 includes a host circuit 104. Host circuit 104 includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit 104 may be configured as a primary platform or base that provides essential infrastructure, resources, and interfaces to facilitate the operation of other connected or integrated components. Host circuit 104 may include any computing device as described in this disclosure, including without limitation a microcontroller, microprocessor, digital signal processor (DSP) and/or system on a chip (SoC) that provide one or more services, resources, or data to other computing devices. Host circuit 104 may include, be included in, and/or communicate with a mobile device such as a mobile telephone or smartphone. Host circuit 104 may include a single computing device operating independently, or may include two or more computing device operating in concert, in parallel, sequentially or the like; two or more computing devices may be included together in a single computing device or in two or more computing devices. In some cases, Host circuit 104 may include but is not limited to, for example, a computing device or cluster of computing devices in a first location and a second computing device or cluster of computing devices in a second location. In other cases, host circuit 104 may include a main unit or a primary circuit in a network that controls communications and/or provide a central point of interface.

With continued reference to FIG. 1, in some cases, at least a processor 108 may include a multi-core processor, wherein the "multi-core processor" is an integrated circuit that contains at least two cores on a single chip. In some cases, at least two processor cores 110 may work simultaneously, allowing multiple tasks to be executed in parallel. A "core," for the purpose of this disclosure, is an individual processor unit within a larger processing unit (e.g., central processing unit [CPU] or graphics processing unit [GPU]). In some cases, "core" may be used interchangeably with the terminology "processor" in this disclosure. Each core 110 of at least two cores 110 may be capable of reading and/or executing one or more program instructions, performing arithmetic operations, managing data, and/or communicating with other components within apparatus 100. In a non-limiting example, at least a processor 108 may include a dual-core processor, quad-core processor, hexa-core processor, octa-core processor, many-core processor, or any processor that may perform simultaneous multi-threading (SMT) and/or dynamic core allocation. In some cases, at least a processor 108 may include one or more integrated graphics cores. In some cases, at least a processor 108 may include a cache architecture, wherein each core 110 may include a private L1 (and in some cases, L2) cache, and all cores 110 may share a larger L3 cache. In some cases, at least a processor 108 may integrate at least two cores 110 that are not identical, for example, and without limitation, a high-performance "heavy" core may be combined with an energy-efficient "lite" core. Host circuit 104 may choose the best core for a task based on power and/or performance needs.

With continued reference to FIG. 1, in some cases, at least a processor 108 may implement a network-on-chip design. Host circuit 104 may interface or communicate with one or more additional devices as described below in further detail via a network interface device. Network interface device may be utilized for connecting host circuit 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, a "memory," for the purpose of this disclosure, is a device used to store programs or data on a temporary or permanent basis for use in host circuit 104 or other computing devices. In some cases, memory 112 may include a space for data to be read or written. In a non-limiting example, memory 112 may include a random access memory (RAM). In some cases, RAM may include a dynamic RAM (DRAM) that stores each bit of data in a separate capacitor within host circuit 104 and being constantly refreshed to maintain the data. In other cases, RAM may include a static RAM (SRAM) that uses one or more flip-flops to store data (i.e., no need for refreshing). In one or more embodiments, memory 112 may be read only (i.e., ROM). Data that is stored in ROM may be hard-wired and cannot be easily altered or re-written. In some cases, memory may retain data even after the power of host circuit 104 is turned off; however, in some cases, data within memory 112 may be wiped and/or removed after host circuit 104 has been turned off and/or use of a particular software has been terminated. In some cases, memory 112 may be programmable. In some cases, user may erase memory 112 (with UV light) and reprogram memory 112. In some cases, memory 112 May include a flash memory e.g., USB drive, memory card, solid-state drive (SSD), or the like. In some cases, memory 112 may include cache memory, wherein at least a processor 108 may store data used most often in the cache memory, thereby making it instantly available to speed up the at least a processor 108. Other exemplary embodiments of memory 112 may include, without limitation, magnetic memory (e.g., hard disk drive [HDD]), optical memory, magnetic tape memory, phase-change memory (PCM), ferroelectric RAM (FeRAM or FRAM), and the like. In some cases, host circuit 104 may include one or more computing devices dedicated to data storage, security, distribution of traffic for load balancing, and the like. In a non-limiting example, memory 112 may include a secondary memory such as an HDD configured to be a long-term storage device in which an operating system and other information is stored. In some cases, data may be retrieved from secondary memory and transmitted to primary memory e.g., RAM during operation of host circuit 104.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, host circuit 104 may distribute one or more computing tasks as described below across a plurality of computing devices of computing device, which may operate in parallel, in series, redundantly, or in any other manner used for distribution of tasks or memory between computing devices. Host circuit 104 may be implemented, as a non-limiting example, using a "shared nothing" architecture. In some cases, host circuit 104 may be designed and/or configured to perform any method, method step, or sequence of method steps in any embodiment described in this disclosure, in any order and with any degree of repetition. For instance, host circuit 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Host circuit 104 may perform any step or sequence of steps as described in this disclosure in parallel, such as simultaneously and/or substantially simultaneously performing a step two or more times using two or more parallel threads, processor cores 110, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 108 is configured to receive at least a software module 116. A "software module," for the purposes of this disclosure, is an application or software that is sought to be executed. For example, and without limitation, software module 116 may include a web browser, word processing software, a media player, a digital calculator, flight systems software, military software and the like. In one or more embodiments, software module 116 may include an application that is sought to be executed within software container 118. In some embodiments, processor 108 may receive a plurality of software modules 116. As a non-limiting example, processor 108 may receive a plurality of software modules 116 that have similar functions. As another non-limiting example, processor 108 may receive a plurality of software modules 116 that have different functions. In one or more embodiments, any data and/or information within software container 118 may be used to ensure proper execution of software module 116. In one or more embodiments, software container 118 may contain libraries, dependencies, and the like to ensure proper execution of software module 116. In one or more embodiments, software module 116 may include an executable file.

With continued reference to FIG. 1, in some embodiments, software container 118 may contain a software module 116. In some embodiments, processor 108 may be configured to receive and/or generate one or more software container. A "software container" for the purposes of this disclosure is an executable package that is capable of running software within an isolated space. For example, and without limitation, software container 118 may include a document drafting software wherein the software container 118 may contain any information, runtime environment and the like necessary to execute the document drafting software on more than one operating systems.

With continued reference to FIG. 1, in one more embodiments, processor 108 may initially receive software module 116 and generate software container 118 as a function of software module 116. In one or more embodiments, processor 108 may be configured to receive at least a software module 116 and generate virtual environment 120 for software module 116. In one or more embodiments, processor 108 and/or multi-core processor may create a separate virtual environment 120 for the at least a software module 116, wherein creating the virtual environment 120 further includes generating virtualization layer and allocating dedicated private static memory space through the virtualization layer, wherein the separate virtual environment 120 may include a dedicated operating system. In one or more embodiments, processor 108 may be configured to integrate the at least a software module 116 into the virtual environment 120 by instantiating, the software module 116 into at least one software container 118. In some embodiments, at least one software container 118 may include a plurality of dedicated software packages. In one or more embodiments, processor 108 may then be configured to execute the software module 116 on each software container 118 for each virtual environment 120. In one or more embodiments, processor 108 may be configured to integrate software module 116 into virtual environment 120 using a pre-defined operational rule by instantiating software module 116 into software container 118, wherein the at least software container 118 may contain a non-preemptible container runtime. In some cases, software module 116 may interact with other components via one or more interfaces (e.g., APIs). In an embodiment, software module 116 may be designed to be reusable and to provide certain functionality that may be integrated into one or more different operating systems or larger software applications. In a non-limiting example, at least one operational rule may include a series of rules or polices that dictate how software module 116 interacts with the system and/or the users, this may include, without limitation, utilize computational resources, how it is executed, and/or the like. In a non-limiting example, in a software critical operating environment (SCOE), such as avionics system as described herein, at least one operational rule may ensure that software module 116 does not interfere with any operation of other system components e.g., partitions within virtual environment 120, that software module 116 may uses dedicated system resources e.g., dedicated private static memory space, or one or more other functionalities or services provided by other partitions within virtual environments 120 in a way that does not degrade system performance, and that software module 116 may run.

With continued reference to FIG. 1, software container 118 may include code, runtime, system tools, system libraries, configurations, and/or the like. In some cases, software container 118 may provide a "second layer" of isolation or protection from virtual environment 120 and other containers and/or partitions. In one or more embodiments, software container 118 may include a standard unit of software that packages up code and all its dependencies such that integrated software module 116 may run under a desired performance from one operating environment and/or operating system to another. An "operating system," as used in this disclosure, is a software program that manages and coordinates hardware and software resources on a computing device. As a non-limiting example, operating system may manage coordination of memory allocation, instructions for processors and/or processor cores 110, and the like. In some cases, software container 118 may be created based on a software image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment with appropriate data services and restrictions. In some cases, partition 124 may interface with a software image repository containing a plurality of software images. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics software, electronic flight bag (EFB) software, ground support equipment software, weather forecasting and reporting software, cockpit display rendering software, and/or the like. In some cases, software image may include a VM image that encapsulate a whole OS along with one or more pre-installed software applications. Such software 116 may be easily replicated across a plurality of host circuits e.g., servers or cloud environment. In other cases, software image may be used as a backup snapshot to restore/roll back system or a software application to a known working state.

With continued reference to FIG. 1, in a non-limiting example, a partition 124 may include a container manager. "Container manager," for the purpose of this disclosure, is a component used to manage and/or orchestrate a plurality of containers. In some cases, each virtual environment 120 include a containerized application environment. In some cases, container manager may be configured to create and further deploy one or more software container 118 within virtual environment 120. In some cases, plurality of software container 118 may be run simultaneously. In an embodiment, container manager may include an engine that provide at least an operating system e.g., CentOS, Debian, Fedora, RHEL, Ubuntu, Windows, MacOS, and/or the like, wherein the engine may enable one or more software container 118 to run in any partition or virtual environment 120 consistently. In some cases, container manager may also be configured to validate the authenticity of software images, load container executables into container environments, connect container environments to operating service, and exports management APIs to other system management tools. In some cases, each partition may include a container manager, and plurality of container managers of plurality of partitions may be (indirectly) communicative each other. In some cases, container manager at second may be known as "container agent." In a non-limiting example, software image may become a software container 118 at runtime-when it is running on the container agent.

With continued reference to FIG. 1, a "non-preemptible container runtime," as described herein, is a runtime that once at least one software container 118 is up and running, it cannot be interrupted or preempted by another processor. In cases where at least one software container 118 is running at RTOS, certain level of service or response time may be guaranteed. In a non-limiting example, at least one software container 118 may be granted access to processor 108, memory 112, and other resources as described above according to partition policy based its priority, and once software module 116 is running, it may have exclusive access to dedicated resources until it completes execution. In a non-limiting example, at least one operational rule of software module 116 and/or software container 118 may be specific one or more safety-critical tasks which must not be delayed or interrupted by other non-critical tasks running on other partitions. Exemplary embodiments of software container 118 may include a DOCKER software container 118 (that encapsulate any payload and dependencies into a single object," RTOS software container 118, safety-certified software container 118 (designed to meet stringent certification requirements of regulatory bodies such as, without limitation, FAA or EASA), among others. In a non-limiting example, software container 118 may capture a flight management software (FMS) module, wherein the FMS module may be configured to perform critical functions related to navigation and flight planning defined by its operational rule. Such FMS module may be instantiated within a software container 118 and run with a non-preemptible runtime to ensure that navigation calculations and related data processing are not interrupted to maintain safety of flight operations.

With continued reference to FIG. 1, in one or more embodiments, instantiating software module 116 into software container 118 may include extracting software metadata from software image. In some embodiments, software metadata may include a plurality of software configuration parameters and a plurality of digital files. As used in this disclosure, "software metadata" is information related to software module 116. In a non-limiting example, software metadata may include a manifest file specifying software version number, required dependencies, configurations and/or the like. In one or more embodiments, software metadata may include or be included within software data. As described herein, "software configuration parameters" are parameters that dictate how a software module should be set up within a particular standard operating environment (SOE). Exemplary software configuration parameters may include, without limitation, one or more environment variables, service endpoints, port numbers, paths to necessary libraries or dependencies, and/or other configuration data necessary for software module 116 to run correctly within virtual environment 120. In some cases, processor 108 may configure container manager within host operating system through virtualization layer to initialize at least one software container 118 within virtual environment 120 as a function of plurality of software configuration parameters by preparing container environment i.e., non-preemptible container runtime based on one or more software configuration parameters. This may be done, for example, by setting up correct file paths, configuring virtual network settings, installing required libraries, and/or the like based on plurality of software configuration parameters. Integrating software module 116 may further include deploying plurality of digital files and/or dedicated software packages within the initialized software container 118. As used in this disclosure, "digital files" are a set of files each containing at least a portion of at least one operational rule. In some cases, plurality of digital files may include any files that necessary for the operation of integrated software module 116, for example, and without limitations, plurality of digital files may include one or more executable files, libraries, scripts, certificates for securities, data files, and/or the like. Container manager may place plurality of digital files and/or dedicated software packages in correct directories, setting permission, prepare container agent to execute plurality of digital files. In some cases, container agent may load at least one operational rule into non-preemptible container runtime. In a non-limiting example, at least one operational rule may govern how software module 116 operates within software container 118 and virtual environment 120 e.g., interaction with other software applications, utilization of dedicated resources, response to certain events, among others.

With continued reference to FIG. 1, in one or more embodiments, software container 118 may create a virtualized environment 120 wherein a software may run within the virtualized environment. For example, and without limitation, software container 118 may operate in a virtualized environment wherein a software within software container 118 may not communicate with the host operating system. In one or more embodiments, software container 118 may allow for OS virtualization wherein a software may be isolated from a host operating system while still sharing the host operating system kernel. "Operating system (OS) level virtualization" for the purposes of this discourse is a system in which an operating system kernel allowed the existence of multiple isolated environment. In OS virtualization, a software within software container 118 may not have access to resources of the host operating system. Instead, the software may only have access to the contents within software container 118. In one or more embodiments, an ordinary software operating outside of a software container 118 may have access to various operating system resources such as but not limited to, processing capabilities, file systems, networks and the like. In contrast, a software operating within a software container 118 may only have access to the contents within the software container 118. This may include various files, network capabilities and the like. In one or more embodiments, a software within software container 118 may communicate with software container 118 wherein software container 118 may transmit the commands to the processor 108. Additional disclosure related to virtual environment 120 may be found in U.S. non-provisional patent application Ser. No. 18/443,540, filed on Feb. 16, 2024, and entitled "APPARATUS AND METHODS FOR A MISSION CRITICAL OPERATING ENVIRONMENT CONTAINER ARCHITECTURE,", the entirety of which is incorporated herein as a reference.

With continued reference to FIG. 1, in one or more embodiments, software container 118 may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within virtual environment as described in further detail below. In one or more embodiments, in application-level virtualization an application may communicate through a virtualization layer such as one created by a hypervisor as described in further detail below. In one or more embodiments, application virtualization may include a process in which the application does not rely on the host operating system kernel. In one or more embodiments, software container 118 may contain OS level virtualization wherein a software within software container 118 may be executed in a virtualized environment. In one or more embodiments, software container 118 may contain application virtualization wherein a software may be executed on multiple differing operating system. In one or more embodiments, in an OS level virtualization, a software may be dependent on the host operating system kernel wherein in an application virtualization, the software may run independent of the host operating system kernel.

With continued reference to FIG. 1, in one or more embodiments, software container 118 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database, and the like. In one or more embodiments, a software within software container 118 may operate in a runtime environment wherein the software may be isolated for the host operating system. In one or more embodiments, software container 118 may allow for an application to be executed and/or deployed on multiple operating systems. In one or more embodiments, software container 118 may contain libraries, configuration files, binary code and/or any other information that is necessary to execute the application and/or software. In one or more embodiments, a software container 118 may contain some degree of independence from the operating system and/or host apparatus 100 wherein the software container 118 does not rely on the operating system for any information needed to properly deploy an application within software container 118. In one or more embodiments, operating systems may lack the proper functionalities to execute an application, wherein software container 118 may be used to ensure that any necessary functionalities, information, and the like are self-contained. In one or more embodiments, software container 118 may contain a container image, wherein the container image is a portable executable image combined with a manifest that is used by a container manager to deploy the container image on an operating environment with appropriate data services and restrictions. In one or more embodiments, software container 118 may contain restrictions and/or instructions on how a software may communicate with the operating system in which it is deployed on. In one or more embodiments, software container 118 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools.

With continued reference to FIG. 1, processor 108 is configured to create a virtual environment 120. As used in this disclosure, a "virtual environment" is a self-contained digital environment within a computing device that allows for the isolation of one or more software from a host operating system (host OS). Host OS may include a primary operating system installed on host circuit's 104 hardware. In some cases, host OS may manage underlaying physical resources and facilitate the running of one or more guest operating systems (guest OS). In a non-limiting example, Linux operating system running on host circuit 104 as the primary operating system may be the host OS. Software applications integrated to host circuit 104 as described herein may be run atop Linux operating system. In some cases, virtual environment 120 may be software-defined, for example, and without limitation, virtual environment 120 may include a simulated operating system that operates independently of the underlaying physical hardware of host circuit 104. In some cases, virtual environment 120 may emulate one or more hardware, software, networks, or a combination thereof.

With continued reference to FIG. 1, processor 108 may be configured to create a separate virtual environment 120 for each of the one or more software containers 118 by allocating a dedicated private static memory space. "Dedicated private memory space" for the purposes of this disclosure refers to a partition of a storage device that is reserved exclusively for software container 118. For example, and without limitation, a storage device may include several partitions wherein at least partition may be reserved exclusively for the use of software container 118. "Dedicated private static memory space" for the purposes of this disclosure refers to a partition having a fixed size value. In a static memory allocation, memory and/or storage may be allocated prior to partitioning and cannot be changed. In contrast to static memory allocation, dynamic memory allocation allows the allocation and deallocation of memory as needed by a particular software and/or operating system. In one or more embodiments, dynamic memory allocation may lead to memory leaks, memory corruption, buffer overflows and the like. In one or more embodiments, dynamic memory allocation may cause other software on apparatus 100 to depend on one another. In one or more embodiments, static memory allocation may allow for increased security and reliability. In one or more embodiments, each virtual environment 120 may be allocated dedicated private static memory space wherein each dedicated private static memory space includes a partition of memory. In one or more embodiments, each dedicated private static memory space may include a child partition that has been created by the root partition. In one or more embodiments, each dedicated private static memory space may contain its own separate virtual environment 120. Additional disclosure related to dedicated private static memory space may be found in U.S. non-provisional patent application Ser. No. 18/443,540, filed on Feb. 16, 2024, and entitled "APPARATUS AND METHODS FOR A MISSION CRITICAL OPERATING ENVIRONMENT CONTAINER ARCHITECTURE," the entirety of which is incorporated herein as a reference.

With continued reference to FIG. 1, creating virtual environment 120 includes creating a plurality of partitions 124. As used in this disclosure, a "partition" is a subdivision of a computer's resources (be it storage, memory, processing power, or any other resource) to create an isolated environment. In an embodiment, processes or tasks running in one partition may not interfere with those running in another. In some cases, partition 124 may include memory partition (i.e., a section of a computer's RAM or storage), processor partition (i.e., a set of processor resources or cores), hardware partition (i.e., physical subdivision of host circuit 104 into smaller units), logical partition (i.e., a virtualization of a separate computer), or any combinations thereof. Each of plurality of partitions 124 includes a virtual machine (VM) 128. In some embodiments, processor 108 may create virtual machine 128 of each of plurality of partitions 124. In a non-limiting example, plurality of partitions 124 may be allocated in side virtual environment 120, wherein each partition of plurality of partitions 124 may include a virtual machine (VM), wherein the "virtual machine," for the purpose of this disclosure, is a software-based emulation of a computer system that is capable of running one or more software applications as if they were running on physical hardware. For instance, and without limitation, virtual environment 120 may include a separate and isolated operating system on host circuit 104 that does not interact with host operating system. Additional disclosure related to plurality of partitions 124 may be found in U.S. non-provisional patent application Ser. No. 18/395,149, filed on Dec. 22, 2023, and entitled "APPARATUS AND METHOD FOR PROVIDING A SAFETY-CRITICAL OPERATING ENVIRONMENT (SCOE)," the entirety of which is incorporated herein as a reference.

With continued reference to FIG. 1, processor 108, in case a multi-core processor as described above may be configured, in some cases, distribute the operation of partitions 124 to plurality of cores 110 of the multi-core processor. As a non-limiting example, processor 108 may assign and/or operate software module partition to a first core of plurality of cores 110 and assign and/or operate other partitions of plurality of partitions 124 to other plurality of cores 110. In some cases, first partition of plurality of partitions 124 e.g., a management VM may be assigned to operate on first core and second partition of plurality of partitions 124 e.g., an application VM may be assigned to operate on second core. In some cases, both partitions may be run in parallel without affecting performance of any partition. In some cases, such hardware isolation may prevent faults in one partition from affecting other which is crucial in SCOE. In a non-limiting example, plurality of partitions 124 may be distributed to plurality of cores 110. In some cases, a partition A may be configured to run flight control system, while another partition B may be running non-critical tasks e.g., in-flight entertainment, wherein entertainment system may never interfere with flight controls. In some cases, processor 108 may allocate different cores 110 to different partitions based on current load and performance requirement. In some cases, hypervisor 132 may be responsible for managing distribution of partitions 124 across plurality of virtual 124 through virtualization layer. In other cases, processor 108 may employ core affinity settings, wherein certain tasks are "affined" or fixed to specific cores 110 to prevent them from being shifted around, which may lead to variability in performance.

With continued reference to FIG. 1, in some embodiments, creating partitions 124 may include instantiating a hypervisor 132. As used in this disclosure, a "hypervisor" is firmware that creates and manage virtual machines. In one or more embodiments, hypervisor 132 may include a software configured as a virtual machine monitor (VMM). In some cases, hypervisor 132 may be configured to allow a physical machine (host) such as host circuit 104 to run a plurality of operating systems simultaneously by virtualizing system hardware e.g., processors, memory, I/O devices, and/or the like. In a non-limiting example, hypervisor 132 may create one or more VMs wherein each VM may host a separate and isolated software operating environment (SOE). In some cases, hypervisor 132 may run directly on the hardware of host circuit 104 without reliance of an operating system. Instantiating hypervisor 132 may include launching or initializing hypervisor 132 in host operating system. In some cases, instantiation of hypervisor 132 may create virtual environment 120 wherein a plurality of partitions (i.e., VMs) can be run and managed. In an embodiment, hypervisor 132 may include a "type 1 hypervisor" that run independently of host operating environment. In a non-limiting example, hypervisor 132 may include a bare metal hypervisor that run directly on the host circuit's 104 hardware and manage one or more quest operating systems. Exemplary type 1 hypervisor may include, without limitation, MICROSOFT HYPER-V, VMWARE ESXI, XEN, and/or the like. In some cases, VMs created by type 1 hypervisor may communicate directly with the hardware of host circuit 104 rather than host operating system. In some cases, VMs created by type 1 hypervisor may not be susceptible to issues caused by the host operating system and/or other VMs in virtual environment 120. In a non-limiting example, one or more VMs may be isolated and unaware of existence of other VMs. In an embodiment, type 1 hypervisor 132 may allow for an increased performance wherein VMs within virtual environment 120 may communicate directly with hardware rather than through the intermediate host operating system. In a non-limiting example, type 1 hypervisor may allow one or more VMs to run simultaneously, wherein the failure of a first VM may not result in a failure of a second VM.

With continued reference to FIG. 1, in another embodiment, hypervisor 132 may include a "type 2 hypervisor" that runs atop host operating system similar to any other software applications. In one or more embodiment, hypervisor 132 may include a hosted hypervisor having resource allocation occurred right above host operating system. In some cases, type 2 hypervisor may rely on host operating system of host circuit 104, whereas in type 1 hypervisor as described above, may only rely on the hardware of host circuit 104. Exemplary type 2 hypervisor may include, without limitation, VMWARE WORKSTATION, ORACLE VIRTUAL BOX, and/or the like. In some cases, when instantiating type 2 hypervisor, at least a processor 108 may launch type 2 hypervisor that has been pre-installed similar to launching any software application. Once host OS is up and running, at least a processor 108 may then start type 2 hypervisor to create, manage and run VMs atop the host OS; however, for type 1 hypervisor, since it runs directly on "bare metal" (i.e., hardware without requiring an underlying operating system), instantiating type 1 hypervisor may involve booting the system from a medium such as, without limitation, a USB drive, CD, or a network source containing hypervisor 132. Once booted, hypervisor 132 may take control of at least a portion of hardware resources and manage and/or launch one or more VMs.

With continued reference to FIG. 1, in some embodiments, processor 108 may then generate a virtualization layer supervised by hypervisor 132, wherein partitions 124 within virtual environment 120 may be operated by the virtualization layer. As used in this disclosure, a "virtualization layer" is a software layer (or interface) that sits between hardware layer (e.g., physical CPU, memory, I/O devices, and/or the like) and virtual environment having one or more VMs. In some cases, virtualization layer may be configured to virtualize the underlaying hardware resources and present the virtualized hardware resources to plurality of VMs as though they are dedicated to each VM. In a non-limiting example, plurality of partitions as described herein may share the same physical hardware resources through virtualization layer, without being aware of each other. In some cases, virtualization layer may be instantiated when hypervisor 132 is booted or launched. In a non-limiting example, in case of a type 1 hypervisor, virtualization layer may be generated when machine starts up since hypervisor 132 directly interface with hardware. In another non-limiting example, in case of a type 2 hypervisor, virtualization layer may be established once hypervisor software is initiated on top of host OS. In some cases, hypervisor 132 may be configured to monitor and manage one or more hardware abstraction and allocate these virtualized resources to designated VMs. In a non-limiting example, virtualized resources may include CPU time, memory space, I/O operations and/or the like. In some cases, virtualized resources may be allocated based on partition policy as described in detail below. In some cases, hypervisor 132 may manage the scheduling of VM tasks on actual cores. In some cases, hypervisor 132 may handle interruptions, exceptions, and any events that occur, deciding which VM or service needs attention. In some cases, hypervisor 132 may be configured to isolate one or more VMs from rest of VMs to maintain system security and stability. In other cases, hypervisor 132 may be configured to manage lifecycle operations of one or more VMs such as, without limitation, creation, modification, deletion, migration, and/or the like.

With continued reference to FIG. 1, in some cases, hypervisor 132 may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU, network adapter, storage controllers, FPGA devices, audio processing cards, solid state drives and the like. In one or more embodiments, SR-IOV may allow for partitions to access a single physical device. In one or more embodiments, partitions 124 (e.g., software module partition 136) may have direct access to a physical device without an operating system allocating resources. In one or more embodiments, SR-IOV may allow for the sharing of resources, such as for example network adapters, while still maintaining independence. In one or more embodiments, SR-IOV may allow for multiple VMs operating on a hypervisor 132 e.g., type 1 hypervisor to have access to physical devices without an intermediary such as a shot operating system. In one or more embodiments, host circuit 104 may contain physical hardware that is capable of virtualization. In one or more embodiments, hypervisor 132 may contain the proper systems and/or software to enable SR-IOV wherein VM may receive a virtual component. In one or more embodiments, SR-IOV may allow for one or more separate virtual environments with direct access to one or more physical hardware components of host circuit 104.

With continued reference to FIG. 1, processor 108 is configured to determine a compliance category 140 of at least a software module 116 as a function of an adherence of the at least a software module 116 to at least one operational rule 144. As used in this disclosure, a "compliance category" is a label that represents the measurement of a conformance of a software module to established guidelines or specifications designed to ensure the safety and reliability of the software module. As a non-limiting example, compliance category 140 may include a label that represents the measurement of a conformance of a software module to established guidelines or specifications designed to ensure the safety and reliability of the software module, especially within environment where failure may lead to significant harm or loss known as "safety standards." In an embodiment, at least a processor 108 may be configured to determine compliance category 140 of software module 116 to ensure that software module 116 may perform all functions specified to at least one operational rule 144. In some cases, compliance category 140 may include one or more binary representation, for example, "1" and "0," "compliant" and "noncompliant" or "TRUE" and "FALSE," wherein "1/TRUE" may indicate software module 116 is compliant with at least one corresponding safety standard and "0/FALSE" may indicate software module 116 is non-compliant with the at least one corresponding safety standard. In other cases, compliance category 140 may include a quantitative value such as a score or a range of scores. In a non-limiting example, compliance category 140 may include a design assurance level classification (DAL). A "design assurance level classification," as described herein, is a labeling of software based on the effects caused by a failure of the software module 116. For example, and without limitation, a software failure associated with a first software module which can potentially put human lives at risk may receive a particular classification whereas a software failure associated with a second software module which may, at most, slightly injure an individual may be given a differing classification. In one or more embodiments, each software module 116 may be associated with a particular DAL. In some embodiments, DAL classification of compliance category 140 may include from DAL-A to DAL-E, where a DAL-A classification may indicate the failure of software module 116 may be catastrophic, causing multiple fatalities, a DAL-B classification may indicate the failure of software module 116 may be hazardous, causing a large negative impact, potentially leading to severe injuries or one fatality, a DAL-C classification may indicate the failure of software module 116 may cause discomfort to occupants and might lead to minor injuries, a DAL-D classification may indicate the failure of software module 116 may slightly reduce the safety margins or may lead to passenger inconvenience and a DAL-E classification may indicate the failure of software module 116 may have no potential harm on safety, airplane operation or occupants comfort. In one or more embodiments, various software modules may be given classifications based on their inherent risk to cause harm to individuals. In one or more embodiments, the DAL of a software may indicate that one software module may require more testing, safety protocols and the like in comparison to other software modules. For example, a DAL-E classified software module may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In a non-limiting example, compliance category 140 of software module 116 may be derived, at least in part, from determined DAL classification. In one or more embodiments, software data may contain DAL certification of at least one container 130.

With continued reference to FIG. 1, in some embodiments, processor 108 may examine runtime behavior 146 of software module 116 or software container 118. In a non-limiting example, processor 108 may create a virtual machine 128 for software module 116 or software container 118, simulate the software module 116 or software container 118 within virtual machine 128 within virtual environment 120 and examine runtime behavior or software module 116 or software container 118. In some embodiments, compliance category 140 may include a design assurance level classification (DAL) associated with software module design assurance level classification (DAL) based on runtime behaviors 146 or container runtime behaviors. For the purposes of this disclosure, a "runtime behavior" refers to how a software behaves while it's running or executing within a larger software system. As a non-limiting example, runtime behavior 146 may include a patterns, trends, and/or anomalies related to input handling, processing logic, resource utilization, error handling, security, latency, monitoring process, or the like related to behavior metrics 150. In some embodiments, runtime behavior 146 may be retrieved from trusted repository 148 or user may manually input runtime behavior 146. The trusted repository 148 disclosed herein is further described below.

With continued reference to FIG. 1, in some embodiments, processor 108 may determine a runtime behavior 146 of at least a software module 116 as a function of a behavior metric 150. For the purposes of this disclosure, a "behavior metric" is the measurable quantity or indicator that is used to assess a software module. As a non-limiting example, behavior metric 150 may include CPU usage, memory consumption, network traffic, response time, error rates, the rate of read and write operations, or the like. In some cases, processor 108 may determine prioritize or rank behavior metric 150 for software module 116 and determine runtime behavior 146 as a function of behavior metric 150. In some cases, behavior metric 150 may include a behavior baseline that indicates measurement that represents the typical or expected performance of software module 116. In some cases, processor 108 may identify a key function of software module 116 and rank behavior metrics 150 as a function of the key function. For example, and without limitation, a key function of software module 116 may include resource management, memory management, hardware management, input and output management, health management, platform service management, container management, or the like. In a non-limiting example, if the key function of software module 116 is memory management, then behavior metric 150 related to software module 116 may include memory consumption, or the like. As a non-limiting example, behavior metric 150 may include expected level of memory usage (e.g., behavior baseline) of exemplary software modules. In some embodiments, processor 108 may retrieve behavior metric 150 from trusted repository 148 or user may manually input behavior metric 150.

With continued reference to FIG. 1, in some embodiments, runtime behavior 146 and/or container runtime behavior may be observed by container agent, container manager, health manager, or data record generated and managed by logging mechanism (in real-time or near real-time). As used in this disclosure, a "health manager" is a component that actively checks the state of various system components to ensure the overall system is functioning correctly. As used in this disclosure, a "logging mechanism" is a system or process that systematically records events, transactions, or other significant observations that occur within software systems, particularly software module. In some cases, health manager may be implemented in a way tailored to fault management and recovery strategies. In some embodiments, health manager may be configured to continuously observe operational status of both hardware components (e.g., host circuit 104, at least a processor 108, sensors connected to the processor 108, memory 112, and/or the like) and software components (e.g., software module 116, plurality of partitions 124, and/or the like) and check integrity of data and software running within partitions 124 to ensure they are not corrupted or behaving erratically. In some cases, logging mechanism may communicate with health manager directly to record significant observations (e.g., runtime behavior 146, recurring issues, or the like). In some cases, health manager may perform one or more diagnostic checks to identify any potential issues, for example, health manager may be configured to run self-tests or health checks at regular intervals or upon system boot-up. In some cases, diagnostic checks may be performed during secure boot. In one or more embodiments, health manager may generate one or more alerts or warnings when it detects issues that may impact system performance or safety. In some cases, one or more pre-defined rules may be used to escalate issues to appropriate level of attention, potentially triggering failover or redundancy mechanisms, if necessary, wherein pre-defined rules may be stored in database. In a non-limiting example, health manager may include a real-time system health monitoring system configured to check operational readiness or one or more aircraft's avionics systems before takeoff and/or during flight, manage any in-flight anomalies, and support maintenance crew in identifying and resolving issue between flights. In some cases, health manager may include an aircraft system monitoring PCS, security event audit FACE PSSS, user authentication FACE PCS, operational mode management PCS, and/or the like implemented from PEO Aviation Enterprise Architecture (EA) and FAF v4.0 interfaces. Additional disclosure related to software module 116, container agent, container manager, health manager and logging mechanism may be found in U.S. non-provisional patent application Ser. No. 18/395,149, filed on Dec. 22, 2023, and entitled "APPARATUS AND METHOD FOR PROVIDING A SAFETY-CRITICAL OPERATING ENVIRONMENT (SCOE)," the entirety of which is incorporated herein as a reference.

With continued reference to FIG. 1, as used in this disclosure, an "operational rule" is a set of instructions or conditions that dictate how the software, when executed, should behave, respond, or operate under specific scenarios or environment. In some embodiments, operational rule 144 may be predefined. In a non-limiting example, operational rule 144 may encapsulate business logic or functional requirements of the software. In some cases, operational rule 144 may specify a plurality of core functionalities and processes the software is intended to perform. In some cases, operational rule 144 may include one or more error handling procedures i.e., how software should respond to unexpected inputs or errors. In some cases, operational rule 144 may include one or more security protocols such as, without limitation, instructions related to authentication, authorization, data protection, and/or the like. In some cases, operational rule 144 may, additionally, or alternatively, include one or more conditions and/or thresholds for software performance e.g., response times, execution times, and/or the like. In an embodiments, operational rule 144 may be configured as a metric to ensure that the software application behaves in a pre-defined way. In another embodiment, operational rule 144 may dictate fail-safe behaviors or fallback procedures. In a non-limiting example, a pre-defined operation rule may dictate how a software application should respond if one or more sensors communicatively connected to host circuit 104 detects a certain anomaly in flight data during cruising e.g., automatically engaging an emergency procedure. In another non-limiting example, a pre-defined operational rule may specify the process and validations for pilot inputs. In some cases, missing operational rule 144 may result in a failure to execute at least a part of the software application. In some cases, operational rule 144 may entirely depend on system health and safety; for example, and without limitation, operational rule 144 may be qualified under DO-178C or to ensure the availability, robustness, and integrity of the SOE. In some embodiments, user may manually input operational rule 144. In some embodiments, processor 108 may receive operational rule 144 from trusted repository 148.

With continued reference to FIG. 1, in some embodiments, at least a processor 108 may be configured to verify a compliance of software module 116 with a plurality of pre-determined safety standards (e.g., operational rule 144) sourced from a trusted repository 148 by monitoring an adherence of the software module 116 to the pre-defined operational rule 144. A "trusted repository," for the purpose of this disclosure, is a trusted entity e.g., a secure storage or even a trusted (third) partition, wherein plurality of safety standards are kept. In a non-limiting example, trusted repository 148 may be considered authoritative and tamper-proof e.g., one or more secure databases, version control systems, and/or certified data centers. In some embodiments, trusted repository 148 may include a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some cases, compliance category 140 may include an assessment of software module's 116 conformance to at least one operational rule 144 that dictate software module's 116 behavior, known as the "adherence." In a non-limiting example, at least one operational rule 144 may dictate how it must perform under various conditions to be considered compliant. In a non-limiting example, at least a processor 108 may be configured to verify the execution of software module 116. In some cases, at least a processor 108 may assign a high score to software module 116 which executed without interference e.g., functions within its runtime without being interrupted or influenced by other processes or partitions, maintaining strict timing and performance as per its safety standards. In another non-limiting example, at least a processor 108 may be configured to check the integrity of data processed e.g., software metadata and/or data transmitted by software module 116 using one or more error-checking algorithm or secure data transmission protocols. In some cases, compliance category 140 may include DO-178C for avionics, ISO 26262 for automotive safety, IEC 61508 for industrial system safety, and/or the like. In some cases, a high compliance category 140 may indicate software module 116 adheres to standards e.g., RTCA/DO-178C for software in airborne systems. In some cases, high compliance category 140 may include a certification of ISO 27001. In a non-limiting example, software module 116 such as a flight control system software may be rigorously tested and verified against DO-178C standard based on observed runtime behaviors 146 through simulation and/or in-flight testing.

With continued reference to FIG. 1, at least a processor 108 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine-learning software program where the commands to be executed are determined in advance by a user and written in a programming language. A machine-learning process may utilize supervised, unsupervised, lazy-learning processes and/or neural networks, described further below.

With continued reference to FIG. 1, at least a processor 108 may utilize a machine-learning module 152 to implement one or more algorithms or generate one or more machine-learning models to determine compliance category 140 of software module 116. However, the machine-learning module 152 is exemplary and may not be necessary to generate one or more machine-learning models and perform any machine-learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from trusted repository 148 as described above or any other databases, or even be provided by end-user. In a non-limiting example, machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine-learning models iteratively produces outputs.

With continued reference to FIG. 1, in some embodiments, processor 108 may be configured to generate compliance training data. In some embodiments, compliance training data may include correlations between exemplary software modules or exemplary runtime behaviors of software module or software container 118 and exemplary compliance categories or exemplary compliance matrices. In some embodiments, processor 108 may generate compliance machine-learning model 154. In some embodiments, machine-learning module 152 may include compliance machine-learning model 154. As a non-limiting example, determining compliance category 140 of software module 116 may include generating a compliance machine-learning model 154 and training compliance machine-learning model 154 using compliance training data, wherein the compliance training data may include a plurality of non-preemptible container runtime behaviors as input correlated to a plurality of compliance metrics as output, and generating a compliance matrix as a function of the non-preemptible container runtime behavior using the trained compliance machine-learning model 154. In some embodiments, compliance training data may be stored in trusted repository 148. In some embodiments, compliance training data may be received from one or more users, trusted repository 148, external computing devices, and/or previous iterations of processing. As a non-limiting example, compliance training data may include instructions from a user, who may be an expert user, a past user in embodiments disclosed herein, or the like, which may be stored in memory and/or stored in trusted repository 148, where the instructions may include labeling of training examples. In some embodiments, compliance training data may be updated iteratively using a feedback loop.

With continued reference to FIG. 1, a "compliance matrix," for the purpose of this disclosure, is a data structure that map out requirements from one or more sets of pre-defined safety standards sourced form trusted repository 148 or specifications to the elements or components of, for example, software module 116, or any other system or process that must meet those requirements. In some cases, compliance matrix may include a tabular data format, wherein a table having one axis lists requirements from safety standards and another axis listed software module's 116 features, components, and/or runtime behaviors 146 identified by at least a processor 108. In some cases, compliance matrix may be filled in to visualize how and where each requirement is addressed. In some cases, at least one axis of said compliance matrix may indicate a compliance status determined by at least a processor 108 as described above corresponding to other axis. In some cases, at least a processor 108 may link specific parts of software metadata e.g., source code, design documents, test cases to individual pre-defined safety standard. In these cases, compliance matrix may be used as a cross-reference tool. In an embodiment, for software module 116 that must comply with DO-178 standards, a compliance matrix may be configured to map each software requirement to specific runtime behaviors 146, unit tests, or even code segments. In a non-limiting example, an exemplary embodiment of a compliance matrix is shown below:

| No. | Safety Standard | Compliance Status |
|---|---|---|
| 1 | Integrity of software image | Compliant/ Non-compliant |
| 2 | Adherence to pre-defined operational rule | Compliant/ Non-compliant |
| 3 | Absence of undesired interference | Compliant/ Non-compliant |
| 4 | Absence of security vulnerabilities | Compliant/ Non-compliant |
| 5 | Execution within allocated time slice | Compliant/ Non-compliant |
| 6 | Execution within private static memory space | Compliant/ Non-compliant |
| 7 | Authenticity of the software module | Compliant/ Non-compliant |
| 8 | No unauthorized access or operations | Compliant/ Non-compliant |
| 9 | Proper container instantiation | Compliant/ Non-compliant |
| 10 | Conformance to data protection standards | Compliant/ Non-compliant |

With continued reference to FIG. 1, in some cases, processor 108 and/or partitions 124 may include a dedicated verification module implementing one or more compliance algorithms, configured as a "watchdog," continuously monitoring the adherence of software module 116 to assess compliance category 140. In some cases, verification module may have access to trusted repository 148 containing plurality of pre-defined safety standards which May include, without limitation, DO-178C for software in airborne systems, ISO26262 for automotive safety, DO-297 for supply chain management, and/or the like. In some cases, verification module may be configured to compare non-preemptible container runtime behavior against one or more above listed pre-define safety standards in real-time; for instance, and without limitation, this may include checking for correct execution of operational rule 144, proper use of system resources such as dedicated execution time slice, private static memory space, and/or the like, adherence to security protocols, among others. In a non-limiting example, verification module may communicate with health manager and/or logging mechanism to monitor a wealth of data recorded. In some cases, verification module may be configured to analyze (e.g., using statistical methods or one or more machine-learning algorithms as described herein) to detect any deviations from expected behaviors as defined by one or more safety standards. In a non-limiting example, at least a machine-learning process, for example, one or more machine-learning models (e.g., compliance machine-learning model 154) may be used to verify; one or more machine-learning models (e.g., compliance machine-learning model 154) may be trained to predict expected runtime behaviors and detect anomalies indicating potential compliance issue. Additionally, or alternatively, signature-based verification may be employed by verification module which use signatures or models created based on compliant behaviors against actual operational data and/or software metadata.

With continued reference to FIG. 1, processor 108 is configured to isolate at least a software module 116 to VM 128 of a software module partition 136 of a plurality of partitions 124. For the purposes of this disclosure, a "software module partition" is a partition at which a software module received by a processor is isolated. Isolating at least a software module 116 includes adjusting partition connections 156 between software module partition 136 and other partitions of the plurality of partitions 124 within virtual environment 120 as a function of compliance category 140. Then, processor 108 is configured to execute at least a software module 116 within virtual environment 120. For the purposes of this disclosure, "partition connections" are the links or communication channels that enable data transfer and communication between partitions. In some cases, adjusting partition connections 156 between plurality of partitions 124 may be based on compliance matrix. In a non-limiting example, processor 108 may be configured to selectively connect and/or disconnect partitions 124 as a function of compliance matrix (e.g., compliance category 140). As a non-limiting example, if software module partition 136 is found to be non-compliant with one or more safety standards (e.g., operational rule 144), processor 108 and/or network controller of software-defined intelligent network (SDIN) 160 may selectively disconnect or isolate software module partition 136 from the rest of system (other partitions of plurality of partitions 124) to prevent potential harm or interference with compliant partitions (e.g., software module partition 136 and other partitions of plurality of partitions 124). In some cases, adjustments of connectivity may include reconfiguring and/or updating software module partition 136 to bring it back into compliance before restoring its connectivity. This may be done, for example and without limitation, through one or more rollback operation which returns software module partition 136 to a previous compliant state. In some cases, adjustments of partition connections 156 may include isolating a security access within virtual environment 120, isolating a memory within virtual environment 120, isolating VM 128 from a host physical system, or the like. This may be done, for example, and without limitation, by adjusting partition connections 156 between plurality of partitions 124 in each VM 128 that have different functions (e.g., memory storage, resource management, security access, or the like).

With continued reference to FIG. 1, in some embodiments, processor 108 may adjust partition connections 156 between partitions 124 by determining a compliance resolution 164. For the purposes of this disclosure, a "compliance resolution" is a method that can improve an adherence of a software module to an operational rule. As a non-limiting example, compliance resolution 164 may include disconnecting software module partition 136 or software module 116 from others, connecting software module partition 136 or software module 116 to different partitions, updating software module partition 136 or software module 116, or the like. In some embodiments, user may manually input compliance resolution 164. In some embodiments, processor 108 may retrieve compliance resolution 164 from trusted repository 148.

With continued reference to FIG. 1, in some embodiments, machine-learning module 152 may include resolution machine-learning model 168. In some embodiments, processor 108 may be configured to generate resolution training data. In a non-limiting example, resolution training data may include correlations between exemplary plurality of partitions including exemplary software module partition, exemplary compliance categories, and/or exemplary compliance resolutions. In some embodiments, resolution training data may be stored in trusted repository 148. In some embodiments, resolution training data may be received from one or more users, trusted repository 148, external computing devices, and/or previous iterations of processing. As a non-limiting example, resolution training data may include instructions from a user, who may be an expert user, a past user in embodiments disclosed herein, or the like, which may be stored in memory and/or stored in trusted repository 148, where the instructions may include labeling of training examples. In some embodiments, resolution training data may be updated iteratively using a feedback loop. As a non-limiting example, processor 108 may update resolution training data iteratively through a feedback loop as a function of output of compliance machine-learning model 154, compliance category 140, or the like. In some embodiments, processor 108 may be configured to generate resolution machine-learning model 168. In a non-limiting example, generating resolution machine-learning model 168 may include training, retraining, or fine-tuning resolution machine-learning model 168 using resolution training data or updated resolution training data. In some embodiments, processor 108 may be configured to determine compliance resolution 164 using resolution machine-learning model 168 (e.g., trained or updated resolution machine-learning model 168). In some embodiments, training resolution machine-learning model 168 or any machine-learning models in machine-learning module 152 (e.g., compliance machine-learning model 154) may include adjusting connection of nodes between software module partition 136, plurality of partitions 124, compliance category 140 and compliance resolution 164. In some embodiments, generating training data and training machine-learning models may be simultaneous.

With continued reference to FIG. 1, in some cases, apparatus 100 may further include a software-defined intelligent network (SDIN) 160. For the purposes of this disclosure, a "software-defined intelligent network" is a network infrastructure that combines the principles of software-defined networking (SDN) with intelligent, adaptive capabilities. In a non-limiting example, SDN may incorporate intelligent orchestrations capabilities that utilize real-time analytics, machine learning (e.g., machine-learning module 152), and artificial intelligence (AI) algorithms to optimize network operations and adapt to changing conditions. For the purposes of this disclosure, "software-defined networking" refers to an architectural approach to network management and configuration that separates the control plane from the data plane within networking devices. SDN decouples the control plane from the data plane in networking devices, allowing centralized control and programmability of the network through software (e.g., adjusting partition connections 156 between partitions 124). In some embodiments, processor 108 may incorporate SDIN 160 to adjust partition connections 156 between plurality of partitions 124. In one or more embodiments, SDIN 160 may be a "smart" networking layer that may dynamically manage the connectivity and data flow between different system components, applications, partitions, and/or the like based on certain criteria, including, without limitation, compliance category 140 of software module 116. In some cases, SDIN 160 may include a network controller that control communication between plurality of partitions 124 within virtual environment 120 through virtualization layer or hypervisor 132. In some cases, SDIN 160 may dynamically alter the connectivity between system components based on predefined rules, operational requirements, and/or real-time assessments such as compliance category 140. In some cases, SDIN 160 may be configured to enforce one or more network polices that dictate how partitions interact, what bandwidth partitions are allocated, which partitions are permitted to communicate, and/or the like. In some cases, SDIN 160 may communicate with container manager that continuously monitor the activity of each partition and adjust partition connections 156 between plurality of partitions 124.

With continued reference to FIG. 1, in one or more embodiments, SDIN 160 may employ machine-learning module 152 which implementing one or more machine-learning algorithms to predict and respond to network needs, detect anomalies that may indicate non-compliance, and automatically reconfigure partition connections 156 for desired performance and safety. In a non-limiting example, one or more machine-learning models may be generated by machine-learning module 152 within SDIN 160 to predict potential compliance violations (e.g., compliance machine-learning model 154) and proactively adjust partition connections 156 before actual violations occur (e.g., resolution machine-learning model 168). In some cases, when software module partition 136 becomes non-compliant, SDIN 160 may automatically initiate procedure to bring it back into compliance such as triggering a security scan for vulnerabilities, or a configuration update. For example, in an avionics system designed with modular architecture as described herein, wherein each software module partition 136 of a plurality of partitions 124 integrated into the system performs a distinct function-navigation, communication, in-flight entertainment, weaponry, and/or the like. These partitions 124 may be interconnected by virtual bus, wherein the SDIN 160 may have privileges to configure hypervisor 132 to manage virtual bus connection between plurality of partitions within virtual environment 120 through virtualization layer. During a routine check, SDIN 160 may detect that in-flight entertainment system may be running outdated software that may have one or more vulnerabilities. In order to prevent any potential risk to aircraft's operations, SDIN 160 may be configured to immediately disconnect in-flight entertainment system so that it may no longer communicate with navigation or communication modules. In some cases, SDIN 160 may reroute passenger devices to a limited network that keeps them disconnected form main avionics but allows for basic functionality such as internet browsing capabilities. In some cases, machine-learning module 152 may lean from historical incident and updates one or more predictive machine-learning models to better anticipate potential compliance lapses. In other cases, users e.g., pilots, technicians, network administrators, passengers may provide user feedback to support SDIN's decision making; for example, user may choose to "trust" or "don't trust" a software module 116. In some cases, machine-learning module 152 may adapt to user feedback to adjust models' parameters, thereby reducing false positives or be more aligned with user expectations and expertise.

With continued reference to FIG. 1, additionally, or alternatively, SDIN 160 may be configured to direct traffic on a network. In contrast to hardware components such as routers which may control a network through hardware, SDIN 160 may be used to dynamically control a network through software module 116. In one or more embodiments, SDIN 160 may be used to control a network wherein data packets may be routed using SDIN 160. In one or more embodiments, SDIN 160 may act as an intermediary between software application or software and a network wherein the SDIN may control the software module 116 interacts with the network. In some cases, SDIN 160 may be used to monitor and control network conditions. In one or more embodiments, SDIN 160 may be used to manage network resources for at least one container. In some cases, at least one container may be limited in network resources due to their level of importance; such that container running less important software image do not crowd a network for less important matters. In a non-limiting example, SDIN 160 may ensure an enablement of one or more dynamic mesh networks, and facilitate assured, secure data sharing across Link-16, BFT, 4586, and RAC2.

With continued reference to FIG. 1, in some embodiments, the use of machine-learning module 152 may improve identifying hidden patterns, correlations, or anomalies that may be difficult for humans or existing systems to detect; for instance, determining compliance category 140 of software module 116, determining compliance resolution 164, adjusting partition connections 156 between partitions 124, or the like. This may enhance the accuracy and efficiency of decision-making processes. In another non-limiting example, machine-learning module 152 may enable the automation of tasks that would otherwise require significant manual effort or expertise. By leveraging machine-learning module 152, apparatus 100 may automatically process, analyze, and interpret large volumes of data, reducing the time and resources required for manual analysis and improving the overall efficiency of the technical process (e.g., related to flight safety). In another non-limiting example, the use of machine-learning module 152 may enable analyzing data and making decisions in real-time or near real-time, allowing processor 108 to respond quickly to changing conditions or dynamic environments within virtual environment 120, furthermore dynamic flight control system environment. In another non-limiting example, machine-learning module 152 may learn from historical data and generate predictive models that forecast future outcomes or trends predict events, identify potential failures or risks (e.g., compliance category 140), optimize resource allocation (e.g., compliance resolution 164), or the like. This proactive approach may enable better planning, resource management, and decision-making. These may be consistent with any machine-learning models described in this disclosure.

Figure 2:
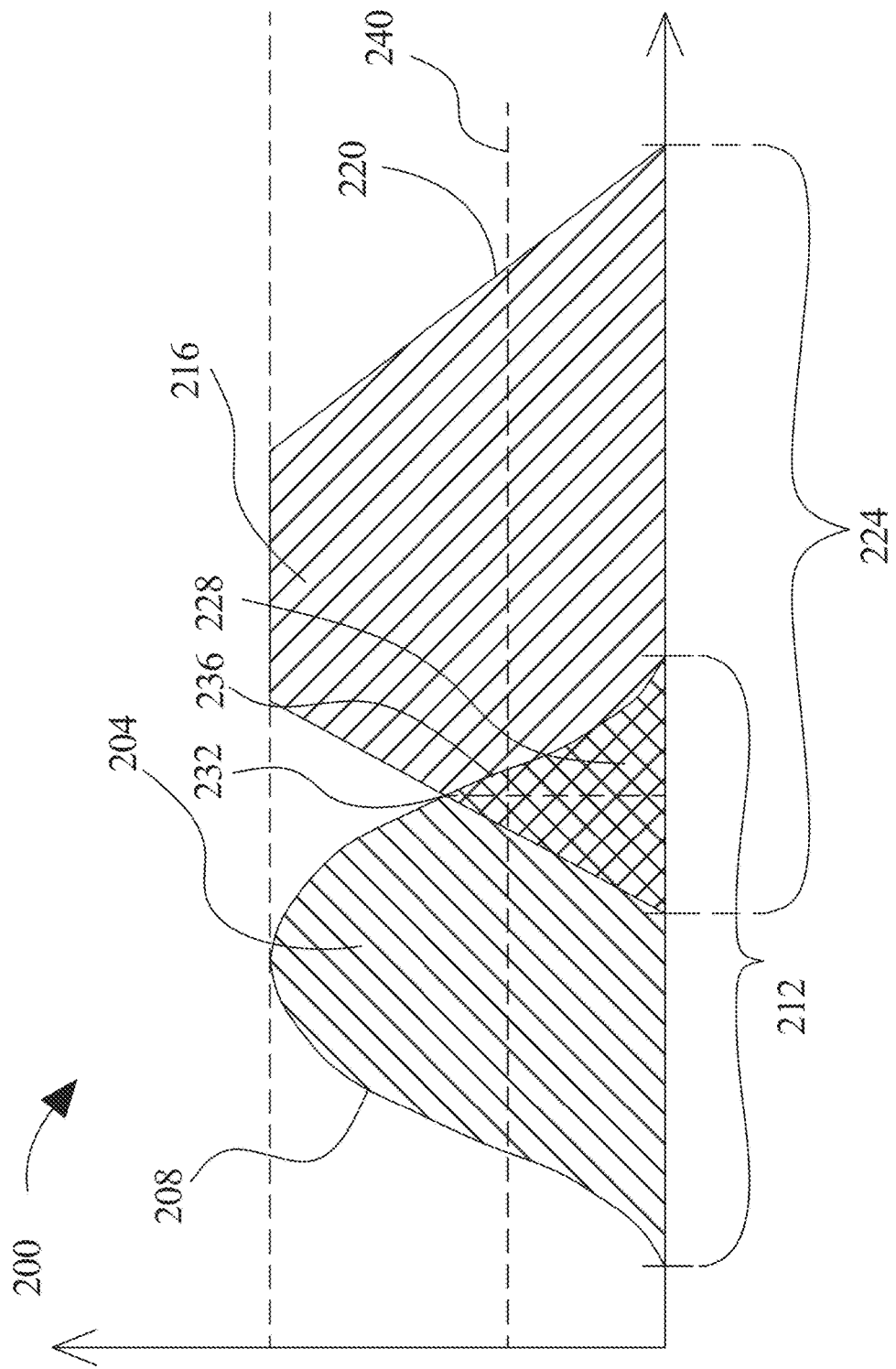
FIG. 2 illustrates a block diagram of an exemplary fuzzy set system.

Referring to FIG. 2, an exemplary embodiment of fuzzy set comparison 200 is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range of values 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 2, first fuzzy set 204 may represent any value or combination of values as described above, including output from one or more machine-learning models and/or runtime behavior 146 of software module 116, and a predetermined class, such as without limitation of compliance category 140. A second fuzzy set 216, which may represent any value which may be represented by first fuzzy set 204, may be defined by a second membership function 220 on a second range 224; second range 224 may be identical and/or overlap with first range of values 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range of values 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between an output from one or more machine-learning models and/or runtime behavior and a predetermined class, such as without limitation compliance categorization, for combination to occur as described above. Alternatively or additionally, each threshold may be tuned by a machine-learning and/or statistical process, for instance and without limitation as described in further detail below.

Further referring to FIG. 2, in an embodiment, a degree of match between fuzzy sets may be used to classify a runtime behavior 146 of software module 116 with compliance category. For instance, if a compliance category has a fuzzy set matching runtime behavior fuzzy set by having a degree of overlap exceeding a threshold, processor 108 may classify the runtime behavior 146 as belonging to the compliance categorization. Where multiple fuzzy matches are performed, degrees of match for each respective fuzzy set may be computed and aggregated through, for instance, addition, averaging, or the like, to determine an overall degree of match.

Still referring to FIG. 2, in an embodiment, a runtime behavior 146 may be compared to multiple compliance categorization fuzzy sets. For instance, runtime behavior 146 may be represented by a fuzzy set that is compared to each of the multiple compliance categorization fuzzy sets; and a degree of overlap exceeding a threshold between the runtime behavior fuzzy set and any of the multiple compliance categorization fuzzy sets may cause processor 108 to classify the runtime behavior as belonging to compliance categorization. For instance, in one embodiment there may be two compliance categorization fuzzy sets, representing respectively compliance (e.g., compliant) categorization and a non-compliance (e.g., non-compliant) categorization, representing respectively a first job description categorization and a second job description categorization. First compliance categorization may have a first fuzzy set; Second compliance categorization may have a second fuzzy set; and runtime behavior may have a runtime behavior fuzzy set. Processor 108, for example, may compare a runtime behavior fuzzy set with each of compliance categorization fuzzy set and incompliance categorization fuzzy set, as described above, and classify a runtime behavior to either, both, or neither of compliance categorization or in compliance categorization. Machine-learning methods as described throughout may, in a non-limiting example, generate coefficients used in fuzzy set equations as described above, such as without limitation x, c, and o of a Gaussian set as described above, as outputs of machine-learning methods. Likewise, runtime behavior may be used indirectly to determine a fuzzy set, as runtime behavior fuzzy set may be derived from outputs of one or more machine-learning models that take the runtime behavior directly or indirectly as inputs.

Still referring to FIG. 2, processor 108 may use a logic comparison program, such as, but not limited to, a fuzzy logic model to determine a compliance category response. A compliance response may include, but is not limited to, no safety effect, minor, major, hazardous, catastrophic, and the like; each such compliance response may be represented as a value for a linguistic variable representing compliance category response or in other words a fuzzy set as described above that corresponds to a degree of potential catastrophic effect as calculated using any statistical, machine-learning, or other method that may occur to a person skilled in the art upon reviewing the entirety of this disclosure. In other words, a given element of runtime behavior may have a first non-zero value for membership in a first linguistic variable value such as "catastrophic" and a second non-zero value for membership in a second linguistic variable value such as "minor" In some embodiments, determining a compliance categorization may include using a linear regression model. A linear regression model may include a machine-learning model. A linear regression model may be configured to map data of runtime behavior, such as degree of potential catastrophic effect to one or more compliance parameters. A linear regression model may be trained using a machine-learning process. A linear regression model may map statistics such as, but not limited to, quality of runtime behavior, potential catastrophic effect. In some embodiments, determining a compliance of runtime behavior may include using a compliance classification model. A compliance classification model may be configured to input collected data and cluster data to a centroid based on, but not limited to, frequency of appearance, linguistic indicators of quality, and the like. Centroids may include scores assigned to them such that quality of potential catastrophic effect of runtime behavior may each be assigned a score. In some embodiments compliance classification model may include a K-means clustering model. In some embodiments, compliance classification model may include a particle swarm optimization model. In some embodiments, determining the compliance of a runtime behavior may include using a fuzzy inference engine. A fuzzy inference engine may be configured to map one or more runtime behavior data elements using fuzzy logic. In some embodiments, runtime behavior may be arranged by a logic comparison program into compliance arrangement. A "compliance arrangement" as used in this disclosure is any grouping of objects and/or data based on skill level and/or output score. This step may be implemented as described in FIGS. 1 and 3-6. Membership function coefficients and/or constants as described above may be tuned according to classification and/or clustering algorithms. For instance, and without limitation, a clustering algorithm may determine a Gaussian or other distribution of questions about a centroid corresponding to a given potential catastrophic effect level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 2, an inference engine may be implemented according to input and/or output membership functions and/or linguistic variables. For instance, a first linguistic variable may represent a first measurable value pertaining to runtime behavior, such as a degree of potential catastrophic effect of an element (e.g., software module 116), while a second membership function may indicate a degree of in compliance of a subject thereof, or another measurable value pertaining to runtime behavior. Continuing the example, an output linguistic variable may represent, without limitation, a score value. An inference engine may combine rules, such as: "if the latency level is 'high' and the error handling level is 'low', the compliance score is 'major'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 2, runtime behavior to be used may be selected by user selection, and/or by selection of a distribution of output scores, such as 20% minor, 40% major, and 88% catastrophic levels or the like. Each compliance categorization may be selected using an additional function such as incompliance as described above.

Figure 3:
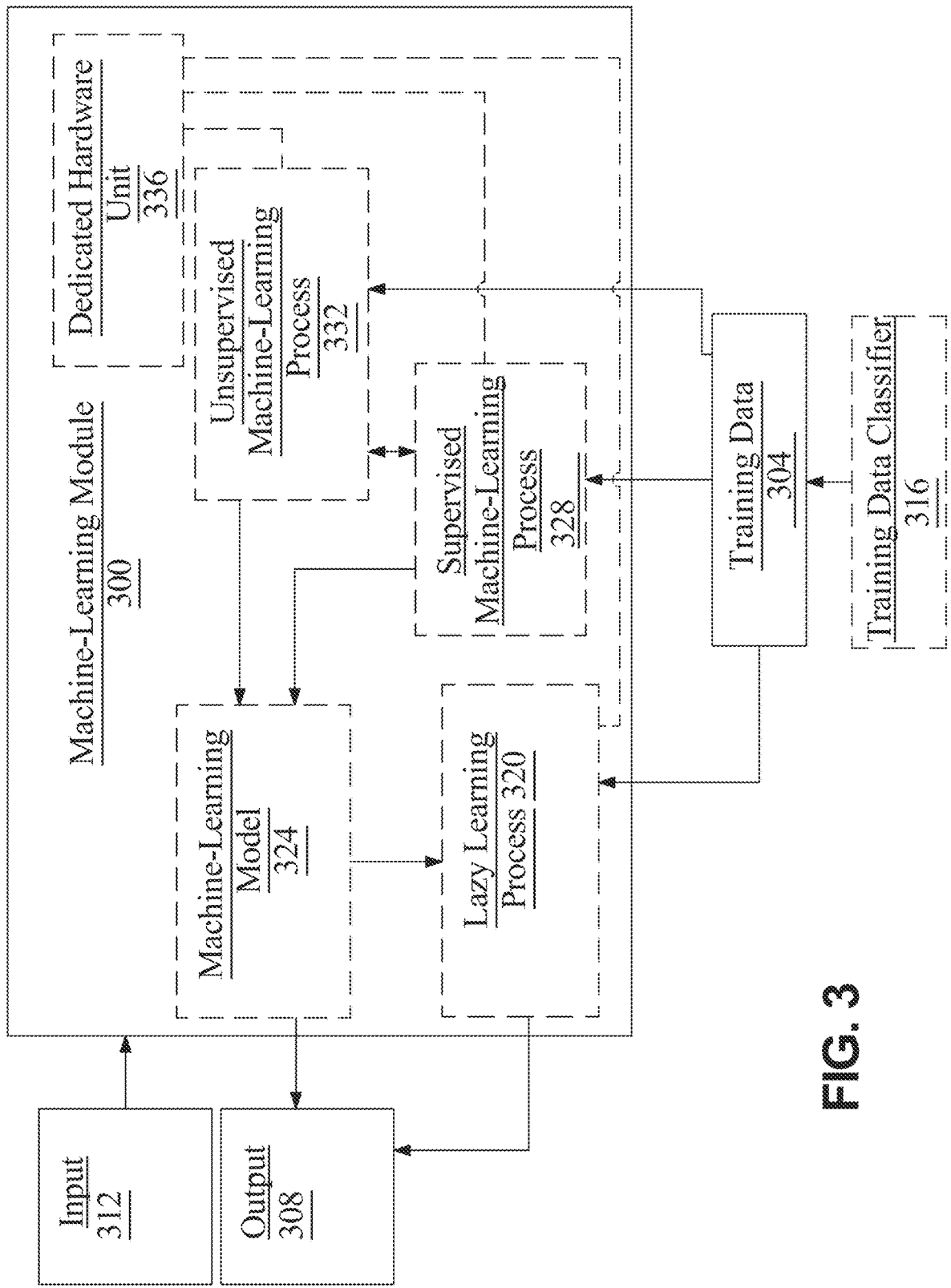
FIG. 3 illustrates a block diagram of exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine-learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include software module 116, runtime behavior of software module 116, partitions 124, compliance category 140, or the like. As a non-limiting illustrative example, output data may include compliance category 140, compliance resolution 164, or the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a flight cohort. For example, and without limitation, training data classifier 316 may classify elements of training data to different flight industries, flight types, flight purposes, aircraft types, or the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) = P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine-learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation o of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include software module 116, runtime behavior of software module 116, partitions 124, compliance category 140, or the like as described above as inputs, compliance category 140, compliance resolution 164, or the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine-learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
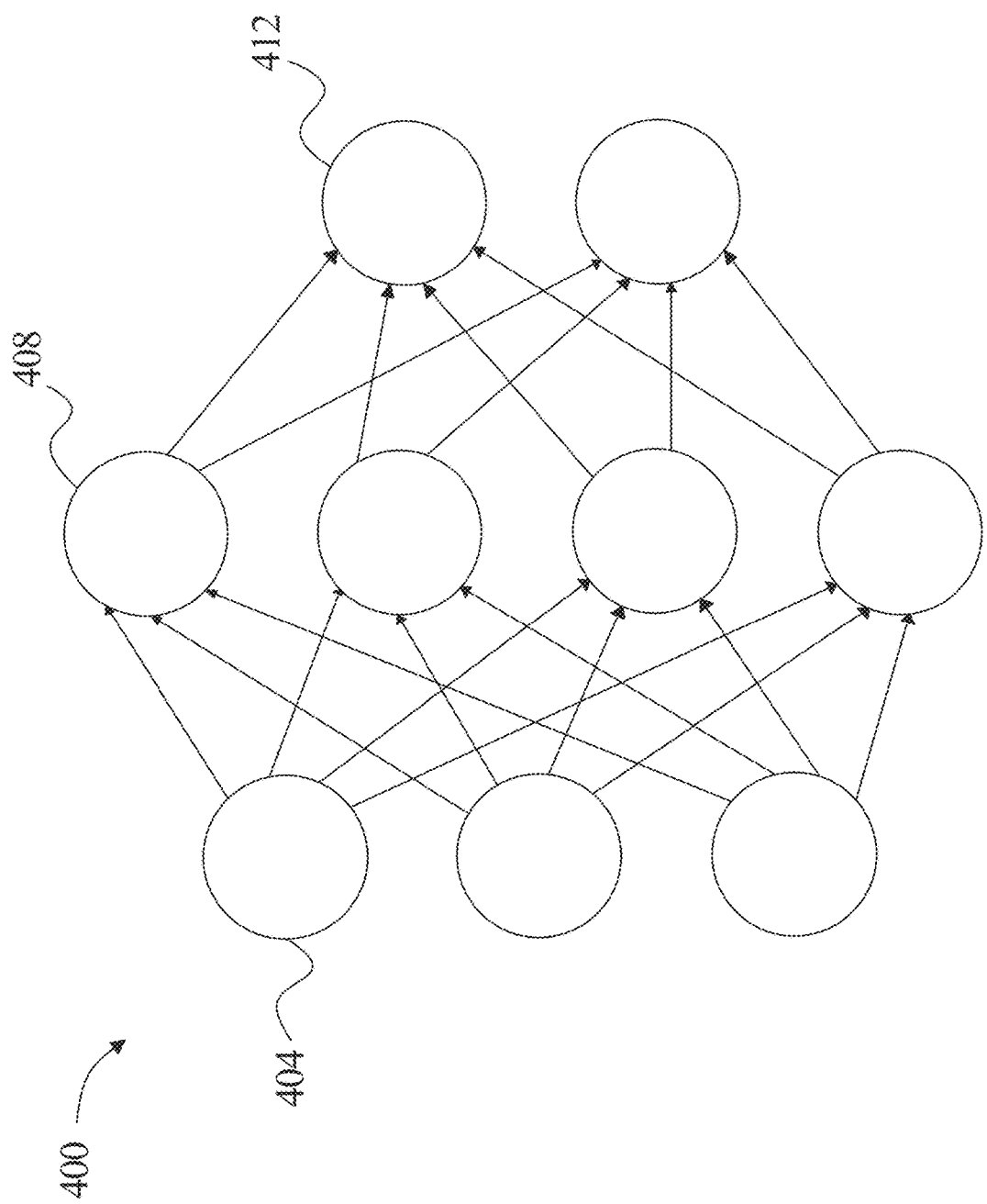
FIG. 4 illustrates a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
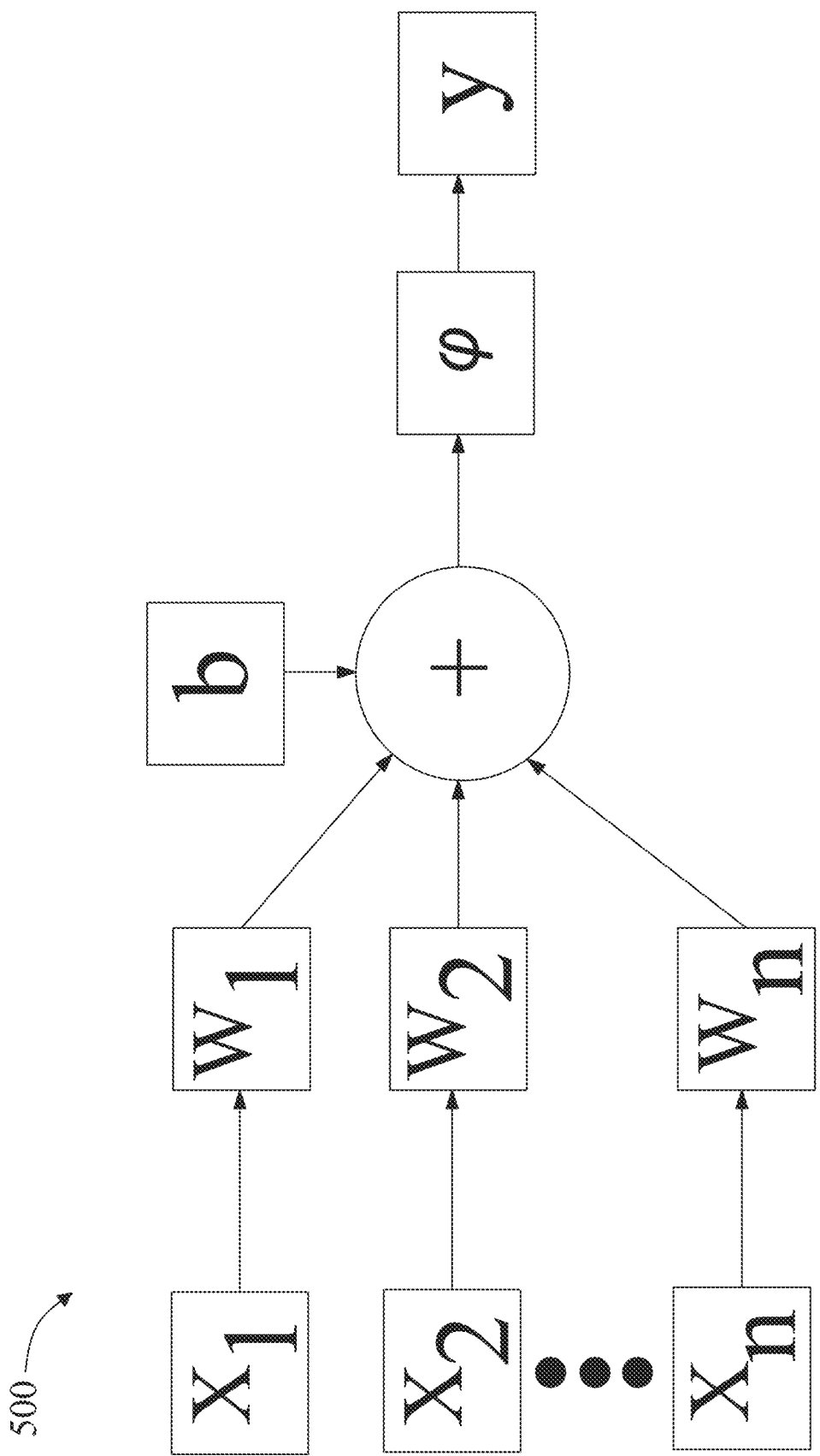
FIG. 5 illustrates a block diagram of an exemplary node.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
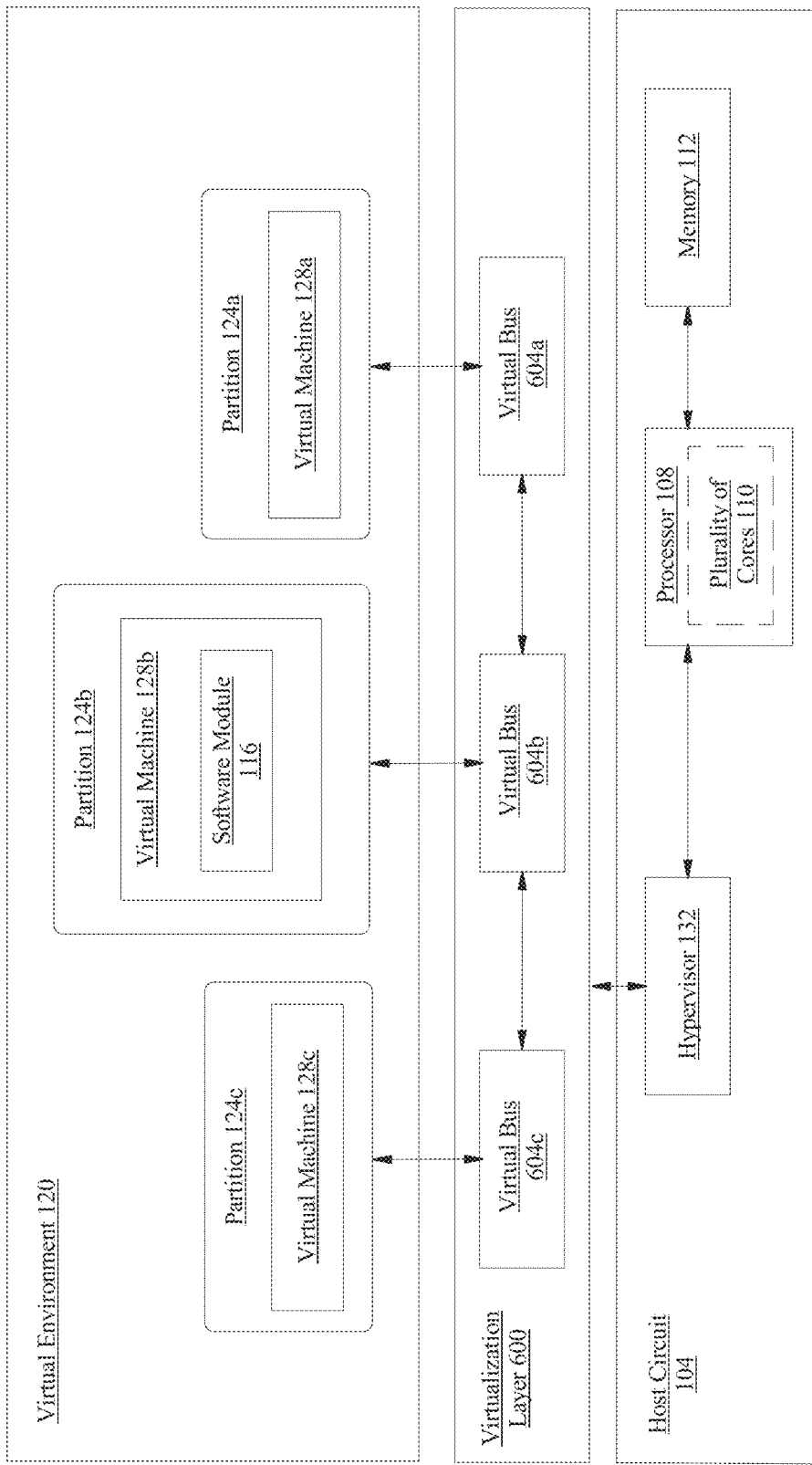
FIG. 6 illustrates a block diagram illustrating an exemplary embodiment of communication between a host circuit and a virtual environment using a virtualization layer.

Referring now to FIG. 6, a block diagram illustrating an exemplary embodiment of communication between host circuit 104 and virtual environment 120 using a virtualization layer 600 is provided. Host circuit 102 includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit 104 may be configured as a primary platform or base that provides essential infrastructure, resources, and interfaces to facilitate the operation of other connected or integrated components. Host circuit 104 may include any computing device as described in this disclosure, including without limitation a microcontroller, microprocessor, digital signal processor (DSP) and/or system on a chip (SoC) that provide one or more services, resources, or data to other computing devices. Host circuit 104 may include, be included in, and/or communicate with a mobile device such as a mobile telephone or smartphone. Host circuit 104 may include a single computing device operating independently, or may include two or more computing device operating in concert, in parallel, sequentially or the like; two or more computing devices may be included together in a single computing device or in two or more computing devices. In some cases, Host circuit 104 may include but is not limited to, for example, a computing device or cluster of computing devices in a first location and a second computing device or cluster of computing devices in a second location. In other cases, host circuit 104 may include a main unit or a primary circuit in a network that controls communications and/or provide a central point of interface.

With continued reference to FIG. 6, in some cases, at least a processor 108 may include a multi-core processor, wherein the "multi-core processor" is an integrated circuit that contains at least two cores on a single chip. In some cases, at least two cores 110 may work simultaneously, allowing multiple tasks to be executed in parallel. A "core," for the purpose of this disclosure, is an individual processor unit within a larger processing unit (e.g., central processing unit [CPU] or graphics processing unit [GPU]). In some cases, "core" may be used interchangeably with the terminology "processor" in this disclosure. Each core of at least two cores 110 may be capable of reading and/or executing one or more program instructions, performing arithmetic operations, managing data, and/or communicating with other components. In a non-limiting example, at least a processor 108 may include a dual-core processor, quad-core processor, hexa-core processor, octa-core processor, many-core processor, or any processor that may perform simultaneous multi-threading (SMT) and/or dynamic core allocation. In some cases, at least a processor 108 may include one or more integrated graphics cores. In some cases, at least a processor 108 may include a cache architecture, wherein each core 110 may include a private L1 (and in some cases, L2) cache, and all cores may share a larger L3 cache. In some cases, at least a processor 108 may integrate at least two cores 110 that are not identical, for example, and without limitation, a high-performance "heavy" core may be combined with an energy-efficient "lite" core. Host circuit 104 may choose the best core for a task based on power and/or performance needs.

With continued reference to FIG. 6, in some cases, at least a processor 108 may implement a network-on-chip design. Host circuit 104 may interface or communicate with one or more additional devices as described below in further detail via a network interface device. Network interface device may be utilized for connecting host circuit 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 6, in some cases, memory 112 may include a space for data to be read or written. In a non-limiting example, memory 112 may include a random access memory (RAM). In some cases, RAM may include a dynamic RAM (DRAM) that stores each bit of data in a separate capacitor within host circuit 104 and being constantly refreshed to maintain the data. In other cases, RAM may include a static RAM (SRAM) that uses one or more flip-flops to store data (i.e., no need for refreshing). In one or more embodiments, memory 112 may be read only (i.e., ROM). Data that is stored in ROM may be hard-wired and cannot be easily altered or re-written. In some cases, memory may retain data even after the power of host circuit 104 is turned off; however, in some cases, data within memory 112 may be wiped and/or removed after host circuit 104 has been turned off and/or use of a particular software has been terminated. In some cases, memory 112 may be programmable. In some cases, user may erase memory 112 (with UV light) and reprogram memory 112. In some cases, memory 112 may include a flash memory e.g., USB drive, memory card, solid-state drive (SSD), or the like. In some cases, memory 112 may include cache memory, wherein at least a processor 108 may store data used most often in the cache memory, thereby making it instantly available to speed up the at least a processor 108. Other exemplary embodiments of memory 112 may include, without limitation, magnetic memory (e.g., hard disk drive [HDD]), optical memory, magnetic tape memory, phase-change memory (PCM), ferroelectric RAM (FeRAM or FRAM), and the like. In some cases, host circuit 104 may include one or more computing devices dedicated to data storage, security, distribution of traffic for load balancing, and the like. In a non-limiting example, memory 112 may include a secondary memory such as an HDD configured to be a long-term storage device in which an operating system and other information is stored. In some cases, data may be retrieved from secondary memory and transmitted to primary memory e.g., RAM during operation of host circuit 104.

With continued reference to FIG. 6, host circuit 104 may operate a plurality of partitions 124*a-c* within a virtual environment 120. In an embodiment, processes or tasks running in one partition may not interfere with those running in another. In some cases, partition may include memory partition (i.e., a section of a computer's RAM or storage), processor partition (i.e., a set of processor resources or cores), hardware partition (i.e., physical subdivision of host circuit 104 into smaller units), logical partition (i.e., a virtualization of a separate computer), or any combinations thereof. In some cases, partition 124*a* may include a boot partition from which an operating system loads or boots up. In some cases, partition 124*a* may include a primary memory partition, wherein the initial memory allocation for a software to load. In some cases, partition 124*a* may also include a main processing partition, for example, partition 124*a* may be responsible for primary tasks such as, without limitation, system management, control tasks, and/or the like as described herein.

With continued reference to FIG. 6, host OS may include a primary operating system installed on host circuit's 104 hardware. In some cases, host OS may manage underlaying physical resources and facilitate the running of one or more guest operating systems (guest OS). In a non-limiting example, Linux operating system running on host circuit 104 as the primary operating system may be the host OS. Software applications integrated to host circuit 104 as described herein may be run atop Linux operating system. In some cases, virtual environment 120 may be software-defined, for example, and without limitation, virtual environment 120 may include a simulated operating system that operates independently of the underlaying physical hardware of host circuit 104. In some cases, virtual environment 120 may emulate one or more hardware, software, networks, or a combination thereof. In a non-limiting example, plurality of partitions 124*a-c* may be allocated in side virtual environment 120, wherein each partition of plurality of partitions 124*a-c* may include a virtual machine (VM) 128*a-c*. For instance, and without limitation, virtual environment 120 may include a separate and isolated operating system on host circuit 104 that does not interact with host operating system.

With continued reference to FIG. 6, operating partitions 124*a-c* may include instantiating a hypervisor 132. In one or more embodiments, hypervisor 132 may include a software configured as a virtual machine monitor (VMM). In some cases, hypervisor 132 may be configured to allow a physical machine (host) such as host circuit 104 to run a plurality of operating systems simultaneously by virtualizing system hardware e.g., processors, memory, I/O devices, and/or the like. In a non-limiting example, hypervisor 132 may create one or more VMs 128*a-c* wherein each VM 128*a-c* may host a separate and isolated software operating environment (SOE). In some cases, hypervisor 132 may run directly on the hardware of host circuit 104 without reliance of an operating system. Instantiating hypervisor 132 may include launching or initializing hypervisor 132 in host operating system. In some cases, instantiation of hypervisor 132 may create virtual environment 120 wherein a plurality of partitions 124*a-c* (i.e., VMs 128*a-c*) can be run and managed. In an embodiment, hypervisor 132 may include a type 1 hypervisor that run independently of host operating environment. In a non-limiting example, hypervisor 132 may include a bare metal hypervisor that run directly on the host circuit's 104 hardware and manage one or more quest operating systems. Exemplary type 1 hypervisor may include, without limitation, MICROSOFT HYPER-V, VMWARE ESXI, XEN, and/or the like. In some cases, VMs 128a-c created by type 1 hypervisor may communicate directly with the hardware of host circuit 104 rather than host operating system. In some cases, VMs 128a-c created by type 1 hypervisor may not be susceptible to issues caused by the host operating system and/or other VMs in virtual environment 120. In a non-limiting example, one or more VMs may be isolated and unaware of existence of other VMs. In an embodiment, type 1 hypervisor 132 may allow for an increased performance wherein VMs within virtual environment 120 may communicate directly with hardware rather than through the intermediate host operating system. In a non-limiting example, type 1 hypervisor may allow one or more VMs 128a-c to run simultaneously, wherein the failure of a first VM may not result in a failure of a second VM.

With continued reference to FIG. 6, in another embodiment, hypervisor 132 may include a type 2 hypervisor that runs atop host operating system similar to any other software applications. In one or more embodiment, hypervisor 132 may include a hosted hypervisor having resource allocation occurred right above host operating system. In some cases, type 2 hypervisor may rely on host operating system of host circuit 104, whereas in type 1 hypervisor as described above, may only rely on the hardware of host circuit 104. Exemplary type 2 hypervisor may include, without limitation, VMWARE WORKSTATION, ORACLE VIRTUAL BOX, and/or the like. In some cases, when instantiating type 2 hypervisor, at least a processor 108 may launch type 2 hypervisor that has been pre-installed similar to launching any software application. Once host OS is up and running, at least a processor 108 may then start type 2 hypervisor to create, manage and run VMs atop the host OS; however, for type 1 hypervisor, since it runs directly on "bare metal" (i.e., hardware without requiring an underlying operating system), instantiating type 1 hypervisor may involve booting the system from a medium such as, without limitation, a USB drive, CD, or a network source containing hypervisor 132. Once booted, hypervisor 132 may take control of at least a portion of hardware resources and manage and/or launch one or more VMs 128a-c.

With continued reference to FIG. 6, at least a processor 108 may then generate a virtualization layer 600 supervised by hypervisor 132, wherein partitions 124a-c within virtual environment 120 may be operated by the virtualization layer 600. In some cases, virtualization layer 600 may be configured to virtualize the underlaying hardware resources and present the virtualized hardware resources to plurality of VMs 128a-c as though they are dedicated to each VM. In a non-limiting example, plurality of partitions 124a-c as described herein may share the same physical hardware resources through virtualization layer 600, without being aware of each other. In some cases, virtualization layer 600 may be instantiated when hypervisor 132 is booted or launched. In a non-limiting example, in case of a type 1 hypervisor, virtualization layer 600 may be generated when machine starts up since hypervisor 132 directly interface with hardware. In another non-limiting example, in case of a type 2 hypervisor, virtualization layer may be established once hypervisor software is initiated on top of host OS. In some cases, hypervisor 132 may be configured to monitor and manage one or more hardware abstraction and allocate these virtualized resources to designated VMs. In a non-limiting example, virtualized resources may include CPU time, memory space, I/O operations and/or the like. In some cases, virtualized resources may be allocated based on partition policy as described in detail below. In some cases, hypervisor 132 may manage the scheduling of VM tasks on actual cores. In some cases, hypervisor 132 may handle interruptions, exceptions, and any events that occur, deciding which VM 128a-c or service needs attention. In some cases, hypervisor 132 may be configured to isolate one or more VMs 128a-c from rest of VMs 128a-c to maintain system security and stability. In other cases, hypervisor 132 may be configured to manage lifecycle operations of one or more VMs 128a-c such as, without limitation, creation, modification, deletion, migration, and/or the like.

With continued reference to FIG. 6, in a non-limiting example, when partition 124a is created, a pre-defined set of virtual hardware resources may be provided by virtualization layer 600, wherein the pre-defined set of virtual hardware resources may include, but is not limited to cores, portion of virtualized memory, virtual disks, virtual network interfaces, among others. As partition 124a attempts to execute one or more operations or access its "hardware," partition 124a may actually interfacing with virtualization layer 600, for instance, and without limitation, when VM 128a-c tries to use at least a processor 108, it may be scheduled by hypervisor 132 onto physical processor on host circuit 104 through virtualization layer 600. In some cases, partition 124a may perceive these resources as if they are dedicated hardware components, oblivious to the abstraction layer beneath. In some cases, virtualization layer 600 may handle I/O operations, translating virtual disk or network accesses to actual operations on the physical hardware. Any interruption, exception, or system call made by partition 124a may be intercepted by virtualization layer 600 which then communicates with hypervisor 132 to handle or service that request.

With continued reference to FIG. 6, in some cases, hypervisor 132 may include single root input output virtualization (SR-IOV). For example, and without limitation, a network adapter may be virtualized wherein multiple virtual adapters may exist. In one or more embodiments, SR-IOV may include the virtualization of physical components such as but not limited to, a GPU, network adapter, storage controllers, FPGA devices, audio processing cards, solid state drives and the like. In one or more embodiments, SR-IOV may allow for partitions to access a single physical device. In one or more embodiments, partition 124a may have direct access to a physical device without an operating system allocating resources. In one or more embodiments, SR-IOV may allow for the sharing of resources, such as for example network adapters, while still maintaining independence. In one or more embodiments, SR-IOV may allow for multiple VMs 128a-c operating on a hypervisor 132 e.g., type 1 hypervisor to have access to physical devices without an intermediary such as a shot operating system. In one or more embodiments, host circuit 104 may contain physical hardware that is capable of virtualization. In one or more embodiments, hypervisor 132 may contain the proper systems and/or software to enable SR-IOV wherein VM 128a-c may receive a virtual component. In one or more embodiments, SR-IOV may allow for one or more separate virtual environments with direct access to one or more physical hardware components of host circuit 104.

With continued reference to FIG. 6, in some embodiments, plurality of partitions 124a-c may include at least a dedicated partition, wherein one or more I/O operations may be consolidated into the at least a dedicated partition. In some cases, such partition may include a specialized VM that is configured to manage and handle I/O operations for other VMs, acting as an intermediary between plurality of partitions and/or quest VMs and physical hardware resources through an I/O physical bus e.g., a virtualized PCI bus that connects devices to main system. In a non-limiting example, at least a dedicated partition may include a I/O VM containing a plurality of FACE I/O service segments (IOSS), wherein each IOSS may provide a standardized interface between OSS and platform-specific hardware. I/O VM may be configured to manage all I/O operations in adherence to FACE technical standards as described above. In a non-limiting example, through plurality of IOSS, I/O VM may include a VM that interface directly with platform's avionic hardware connected to host circuit 104 in a way that is standardized across different air vehicles and systems. In some cases, standardized device drives and/or adapters may be provided by IOSS for various avionic devices. For example, when a quest VM or a software application integrated into the system as described below wants to access a hardware resources, it may be configured to indirectly communicate with the I/O VM, plurality of IOSS having standardized drivers for the hardware may process the request as per pre-defined system specification (e.g., FACE specification). In these cases, other partitions or VMs may be less susceptible to I/O-related faults or security breaches. Security protocols may be standardized and attach surface may be reduced by centralizing drivers and I/O operations since other VMs do not directly access I/O hardware, reducing potential vulnerabilities. In other cases, updates or changes to one or more I/O device drivers or I/O related services may be done in I/O VM without affecting or rebooting the rest of VMs.

With continued reference to FIG. 6, in some cases, virtualization layer 600 may include a virtual bus 604a-c. As used in this disclosure, a "virtual bus" is a software construct that mimics the functionality of a physical bus. In an embodiment, (I/O) virtual bus 604a-c may include a virtualization of I/O physical bus that facilitates communication between different components within virtual environment 120 or even different virtual environments. In a non-limiting example, virtual bus 604a-c may connect first partition 108a with second partition 108b. In some cases, management VM (e.g., first partition 108a) may send one or more administrative commands to software module 128 (e.g., second partition 124b). Additionally, virtual bus 604a-c may also connect first partition 124a with plurality of third partitions 108c, allowing management VM to communicate with other ancillary or service-oriented partitions. Virtual bus 604a-c may be set up in such a way that second partition 124b is isolated from direct communication with plurality of third partitions 124c; this means that any communication must go through first partition 124a. In this case, software application running on second partition 124b may not be able to directly access or be accessed by one or more services or functions running on plurality of third partitions 124c. In a non-limiting example, plurality of third partitions 124c may include various utility services e.g., logging, diagnostics, communication, backup services, wherein the virtual bus may ensure second partition 124b e.g., flight navigation system can only communicate with a controller-management VM, and not directly with other utility services which may be less secure. In an embodiment, logging mechanism may monitor second partition's 124b through virtual bus 604a-c e.g., a communication channel that transmits data and events to be logged while maintaining isolation between partitions within virtual environment 120. In some cases, all events during the secure boot process, including, without limitation, any verification failures or anomalies, can be communicated to first partition 124a through virtual bus 604a-c and logged by logging mechanism. Additional disclosure related to virtual bus 604a-c can be found in U.S. non-provisional patent application Ser. No. 18/395,149, filed on Dec. 22, 2023, and entitled "APPARATUS AND METHOD FOR PROVIDING A SAFETY-CRITICAL OPERATING ENVIRONMENT (SCOE)," the entirety of which is incorporated herein as a reference.

Figure 7:
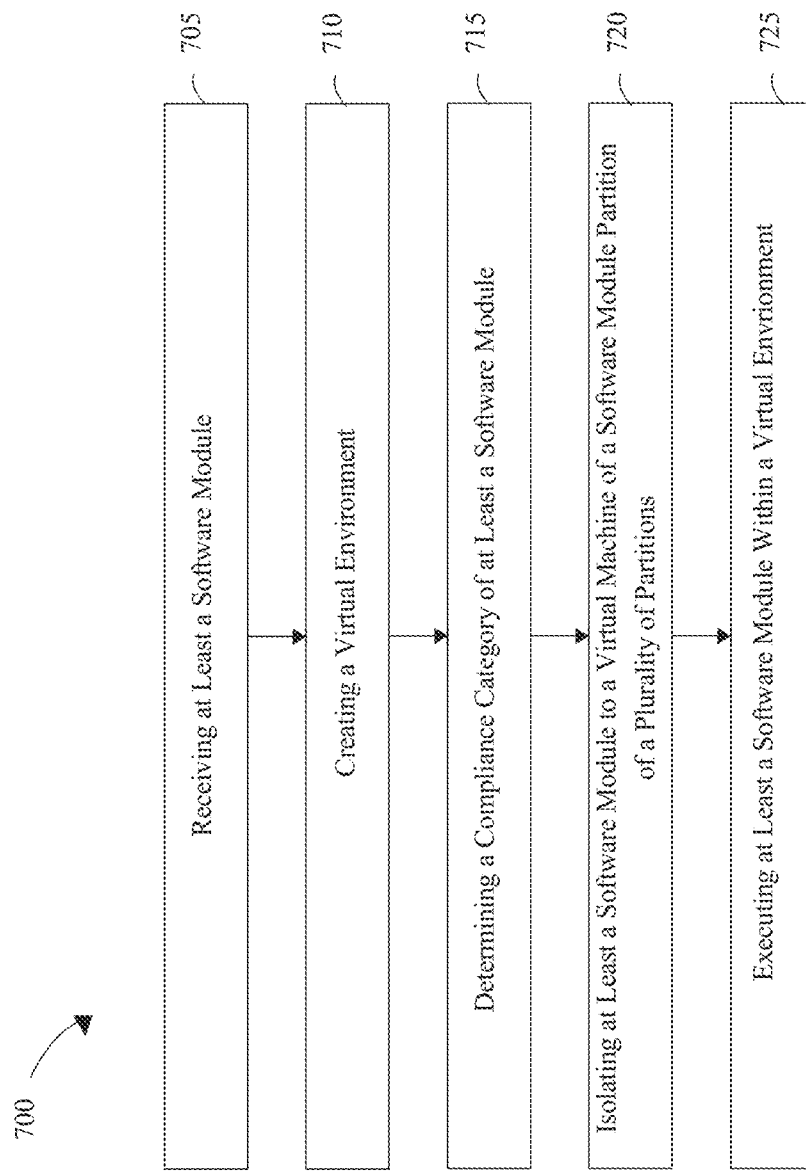
FIG. 7 illustrates a flow diagram of an exemplary method for increasing security of a virtual machine.

Referring now to FIG. 7, a flow diagram of an exemplary method 700 for increasing security of virtual machine is illustrated. Method 700 contains a step 705 of receiving, using at least a processor of a host circuit, at least a software module. In some embodiments, the at least a processor may include a multi-core processor comprising a plurality of cores and creating virtual environment may include creating separate virtual environment for each of the at least a software by assigning at least one dedicated processor core of the at least one multi-core processor to each separate virtual environment. In some embodiments, method 700 may further include instantiating, using the at least a processor, the at least a software module into at least one software container In some embodiments, method 700 may further include determining, using the at least a processor, a runtime behavior of the at least a software module as a function of a behavior metric. These may be implemented, without limitation, as described above with reference to FIGS. 1-6.

With continued reference to FIG. 7, method 700 contains a step 710 of creating, using at least a processor, a virtual environment, wherein creating the virtual environment includes creating a plurality of partitions, wherein each of the plurality of partitions includes a virtual machine (VM). This may be implemented, without limitation, as described above with reference to FIGS. 1-6.

With continued reference to FIG. 7, method 700 contains a step 715 of determining, using he at least a processor, a compliance category of at least a software module as a function of an adherence of the at least a software module to at least one operational rule. In some embodiments, method 700 may further include generating, using the at least a processor, compliance training data, wherein the compliance training data may include correlations between exemplary runtime behaviors and exemplary compliance categories, training, using the at least a processor, a compliance machine-learning model using the compliance training data and determining, using the at least a processor, the compliance category using the trained compliance machine-learning model. In some embodiments, method 700 may further include iteratively training, using the at least a processor, the compliance machine-learning model using a feedback loop as a function of previous iterations of the compliance machine-learning model. These may be implemented, without limitation, as described above with reference to FIGS. 1-6.

With continued reference to FIG. 7, method 700 contains a step 720 of isolating, using at least a processor, at least a software module to a VM of a software module partition of a plurality of partitions, wherein isolating the at least a software module includes adjusting partition connections between the software module partition and other partitions of the plurality of partitions within a virtual environment as a function of a compliance category. In some embodiments, creating the virtual environment may include creating the virtual environment using a hypervisor. In some embodiments, method 700 may further include determining, using the at least a processor, at least a compliance resolution as a function of compliance category of the at least a software module. In some embodiments, method 700 may further include generating, using the at least a processor, resolution training data, wherein the resolution training data may include correlations between exemplary compliance categories and exemplary compliance resolutions, training, using the at least a processor, a resolution machine-learning model using the resolution training data and determining, using the at least a processor, the compliance resolution using the trained resolution machine-learning model. In some embodiments, method 700 may further include adjusting, using the at least a processor, the partition connections between the software module partition and other partitions of the plurality of partitions using a software-defined intelligent network (SDIN). These may be implemented, without limitation, as described above with reference to FIGS. 1-6.

With continued reference to FIG. 7, method 700 contains a step 725 of executing, using at least a processor, at least a software module within a virtual environment. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
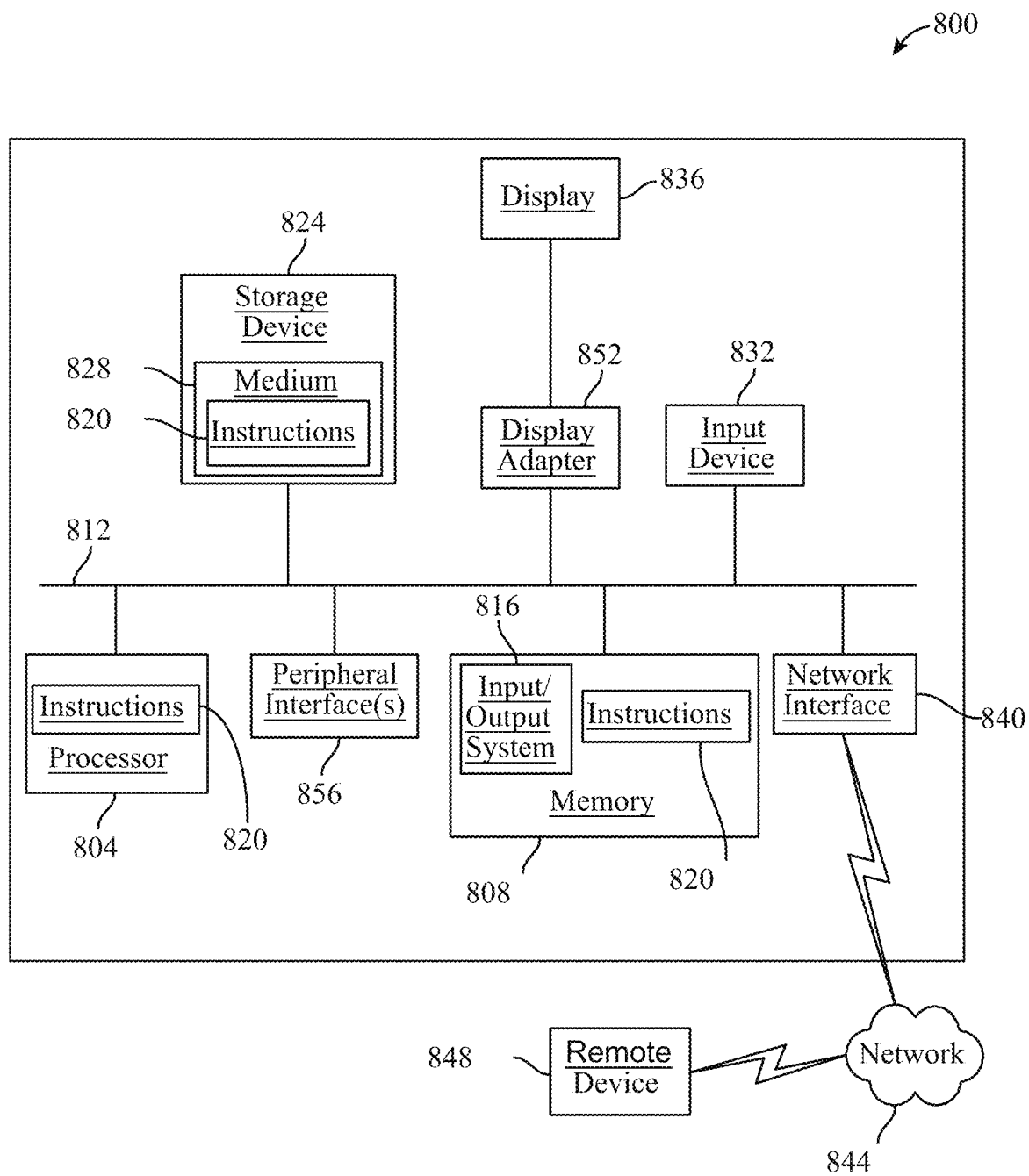
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for increasing security of a virtual machine, the apparatus comprising:
   a host circuit having at least a processor and a memory communicatively connected to the at least a processor, wherein the memory contains instructions configuring the at least a processor to:
   receive at least a software module;
   create a virtual environment, wherein creating the virtual environment comprises:
     creating a plurality of partitions, wherein each of the plurality of partitions comprises a virtual machine (VM);
   determine a compliance category of the at least a software module, wherein the compliance category comprises a design assurance level classification (DAL) based on effects caused by a failure of the at least a software module, as a function of an adherence of the at least a software module to at least one operational rule;
   isolate the at least a software module to the VM of a software module partition of the plurality of partitions, wherein isolating the at least a software module comprises:
     adjusting partition connections between the software module partition and other partitions of the plurality of partitions within the virtual environment as a function of the compliance category and the DAL; and
   execute the at least a software module within the virtual environment.

2. The apparatus of claim 1, wherein:
   the at least a processor comprises a multi-core processor comprising a plurality of cores; and
   creating the virtual environment comprises creating a separate virtual environment for each of the at least a software module by assigning at least one dedicated processor core of the at least one multi-core processor to each separate virtual environment.

3. The apparatus of claim 1, wherein the memory contains instructions further configuring the at least a processor to instantiate the at least a software module into at least one software container.

4. The apparatus of claim 1, wherein creating the virtual environment comprises creating the virtual environment using a hypervisor.

5. The apparatus of claim 1, wherein the memory contains instructions further configuring the at least a processor to determine a runtime behavior of the at least a software module as a function of a behavior metric.

6. The apparatus of claim 1, wherein the memory contains instructions further configuring the at least a processor to:
generate compliance training data, wherein the compliance training data comprises correlations between exemplary runtime behaviors and exemplary compliance categories;
train a compliance machine-learning model using the compliance training data; and
determine the compliance category using the trained compliance machine-learning model.

7. The apparatus of claim 6, wherein the memory contains instructions further configuring the at least a processor to iteratively train the compliance machine-learning model using a feedback loop as a function of previous iterations of the compliance machine-learning model.

8. The apparatus of claim 1, wherein the memory contains instructions further configuring the at least a processor to determine at least a compliance resolution as a function of compliance category of the at least a software module.

9. The apparatus of claim 8, wherein the memory contains instructions further configuring the at least a processor to:
generate resolution training data, wherein the resolution training data comprises correlations between exemplary compliance categories and exemplary compliance resolutions;
train a resolution machine-learning model using the resolution training data; and
determine the compliance resolution using the trained resolution machine-learning model.

10. The apparatus of claim 1, wherein the memory contains instructions further configuring the at least a processor to adjust the partition connections between the software module partition and other partitions of the plurality of partitions using a software-defined intelligent network (SDIN).

11. A method for increasing security of a virtual machine, the method comprising:
receiving, using at least a processor of a host circuit, at least a software module;
creating, using the at least a processor, a virtual environment, wherein creating the virtual environment comprises:
creating a plurality of partitions, wherein each of the plurality of partitions comprises a virtual machine (VM);
determining, using the at least a processor, a compliance category of the at least a software module, wherein the compliance category comprises a design assurance level classification (DAL) based on effects cause by a failure of the at least a software module, as a function of an adherence of the at least a software module to at least one operational rule;
isolating, using the at least a processor, the at least a software module to the VM of a software module partition of the plurality of partitions, wherein isolating the at least a software module comprises:
adjusting partition connections between the software module partition and other partitions of the plurality of partitions within the virtual environment as a function of the compliance category and the DAL; and
executing, using the at least a processor, the at least a software module within the virtual environment.

12. The method of claim 11, wherein:
the at least a processor comprises a multi-core processor comprising a plurality of cores; and
creating the virtual environment comprises creating a separate virtual environment for each of the at least a software by assigning at least one dedicated processor core of the at least one multi-core processor to each separate virtual environment.

13. The method of claim 11, further comprising:
instantiating, using the at least a processor, the at least a software module into at least one software container.

14. The method of claim 11, wherein creating the virtual environment comprises creating the virtual environment using a hypervisor.

15. The method of claim 11, further comprising:
determining, using the at least a processor, a runtime behavior of the at least a software module as a function of a behavior metric.

16. The method of claim 11, further comprising:
generating, using the at least a processor, compliance training data, wherein the compliance training data comprises correlations between exemplary runtime behaviors and exemplary compliance categories;
training, using the at least a processor, a compliance machine-learning model using the compliance training data; and
determining, using the at least a processor, the compliance category using the trained compliance machine-learning model.

17. The method of claim 16, further comprising:
iteratively training, using the at least a processor, the compliance machine-learning model using a feedback loop as a function of previous iterations of the compliance machine-learning model.

18. The method of claim 11, further comprising:
determining, using the at least a processor, at least a compliance resolution as a function of compliance category of the at least a software module.

19. The method of claim 18, further comprising:
generating, using the at least a processor, resolution training data, wherein the resolution training data comprises correlations between exemplary compliance categories and exemplary compliance resolutions;
training, using the at least a processor, a resolution machine-learning model using the resolution training data; and
determining, using the at least a processor, the compliance resolution using the trained resolution machine-learning model.

20. The method of claim 11, further comprising:
adjusting, using the at least a processor, the partition connections between the software module partition and other partitions of the plurality of partitions using a software-defined intelligent network (SDIN).

* * * * *